(12) United States Patent
Satoh et al.

(10) Patent No.: US 9,507,189 B2
(45) Date of Patent: Nov. 29, 2016

(54) DISPLAY PANEL, DISPLAY DEVICE, AND METHOD FOR MANUFACTURING DISPLAY PANEL

(71) Applicant: Sharp Kabushiki Kaisha, Osaka (JP)

(72) Inventors: Eiji Satoh, Osaka (JP); Takuma Tomotoshi, Osaka (JP); Tomoko Teranishi, Osaka (JP); Takahiro Nakahara, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 2 days.

(21) Appl. No.: 14/424,575

(22) PCT Filed: Sep. 2, 2013

(86) PCT No.: PCT/JP2013/073535
§ 371 (c)(1),
(2) Date: Feb. 27, 2015

(87) PCT Pub. No.: WO2014/034930
PCT Pub. Date: Mar. 6, 2014

(65) Prior Publication Data
US 2015/0219946 A1 Aug. 6, 2015

(30) Foreign Application Priority Data

Sep. 3, 2012 (JP) ................. 2012-193429
Apr. 19, 2013 (JP) ................. 2013-088689

(51) Int. Cl.
| | |
|---|---|
| *G02F 1/133* | (2006.01) |
| *G02F 1/19* | (2006.01) |
| *G02B 26/08* | (2006.01) |
| *G02F 1/137* | (2006.01) |
| *G02F 1/167* | (2006.01) |

(52) U.S. Cl.
CPC ....... *G02F 1/13306* (2013.01); *G02B 26/0841* (2013.01); *G02F 1/137* (2013.01); *G02F 1/167* (2013.01); *G02F 1/19* (2013.01); *G02F 1/13725* (2013.01)

(58) Field of Classification Search
CPC .................................................. G02F 1/13306
See application file for complete search history.

(56) References Cited

U.S. PATENT DOCUMENTS

| | | |
|---|---|---|
| 6,665,042 B1 | 12/2003 | Marshall et al. |
| 6,829,075 B1 | 12/2004 | Kosc et al. |
| 2002/0097362 A1* | 7/2002 | Yamada ................... A23D 9/00 349/130 |
| 2006/0267902 A1* | 11/2006 | Akiyama ............. G09G 3/3688 345/98 |

(Continued)

FOREIGN PATENT DOCUMENTS

| | | |
|---|---|---|
| JP | 10-253993 A | 9/1998 |
| JP | 2003-533736 A | 11/2003 |

(Continued)

*Primary Examiner* — Paisley L Arendt
*Assistant Examiner* — Edmond Lau
(74) *Attorney, Agent, or Firm* — Chen Yoshimura LLP

(57) ABSTRACT

The present invention provides a display panel that exhibits increased light use efficiency and decreased occurrence of display anomalies. The display panel includes substrates; a light modulating layer that contains shape-anisotropic members that rotate according to the direction of an electric field and that controls the transmittance of incident light by changing the area projected onto the substrates by the shape-anisotropic members; and supporting members that support the shape-anisotropic members and are rotatably connected thereto.

15 Claims, 24 Drawing Sheets

(56) References Cited

U.S. PATENT DOCUMENTS

| | | | |
|---|---|---|---|
| 2008/0037105 A1* | 2/2008 | Van Bommel | B82Y 30/00 359/296 |
| 2009/0278827 A1* | 11/2009 | Yokoyama | G09G 3/2011 345/204 |
| 2010/0149480 A1* | 6/2010 | Miyachi | C09K 19/02 349/185 |
| 2011/0310321 A1* | 12/2011 | Katayama | G02F 1/1395 349/38 |
| 2012/0019738 A1* | 1/2012 | Cox | C09K 19/38 349/36 |
| 2012/0147280 A1* | 6/2012 | Osterman | G02B 27/26 349/9 |

FOREIGN PATENT DOCUMENTS

| | | |
|---|---|---|
| JP | 2008-503788 A | 2/2008 |
| JP | 2010-20003 A | 1/2010 |
| WO | 01/88607 A1 | 11/2001 |
| WO | 2006/000996 A1 | 1/2006 |

* cited by examiner

FIG. 2
(a)
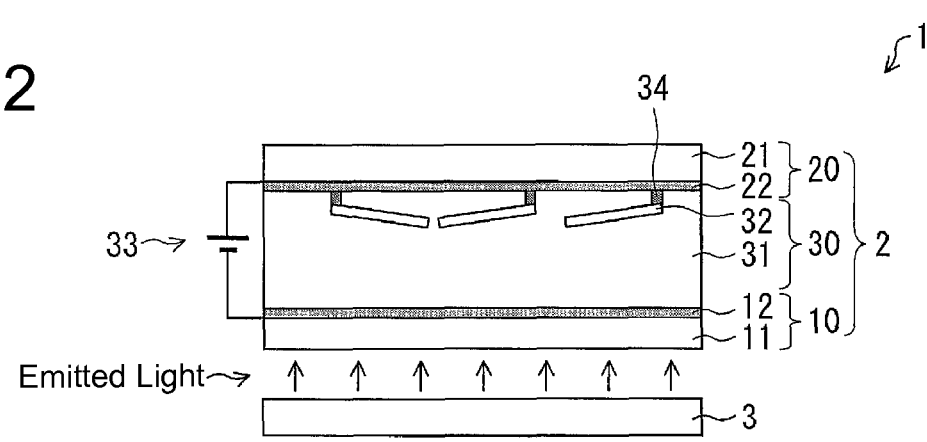
(b)
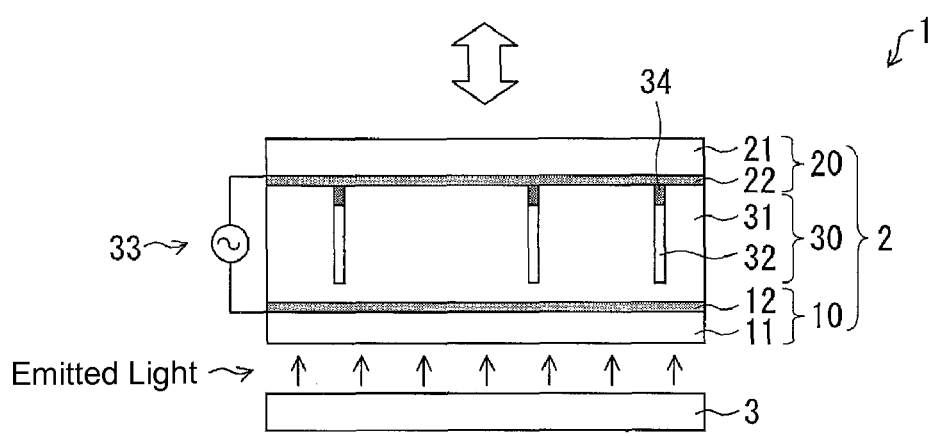
(c)
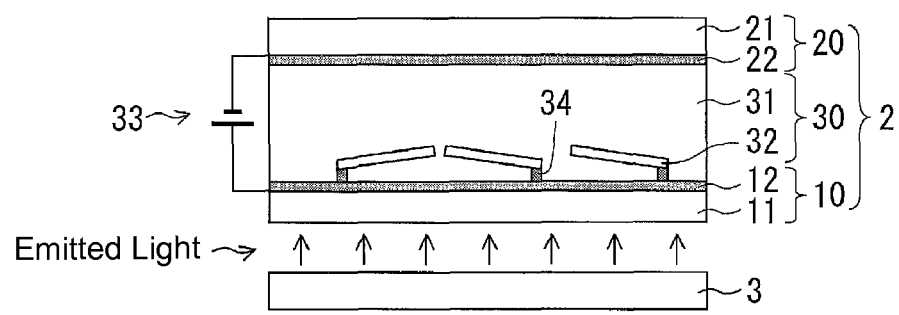
(d)
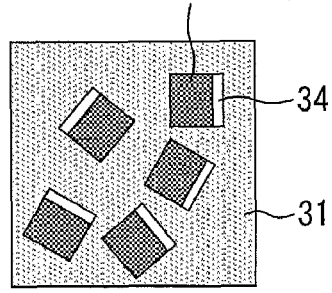
(e)
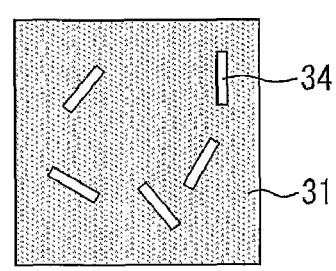

FIG. 4
(a)
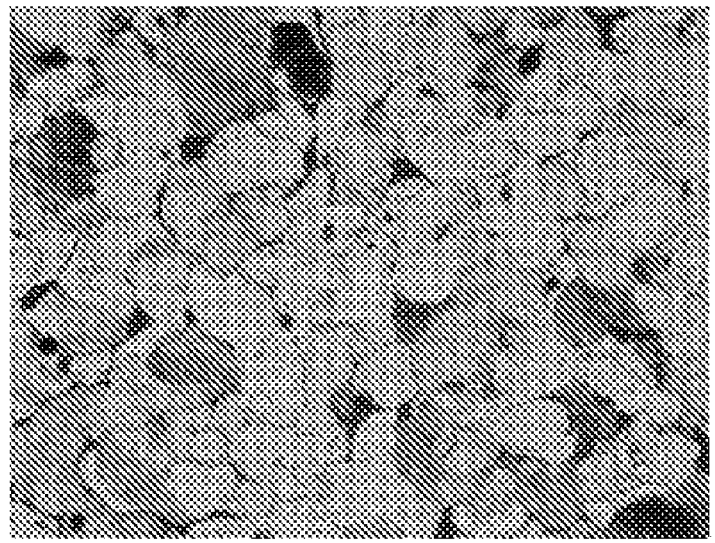
(b)

FIG. 5
(a)
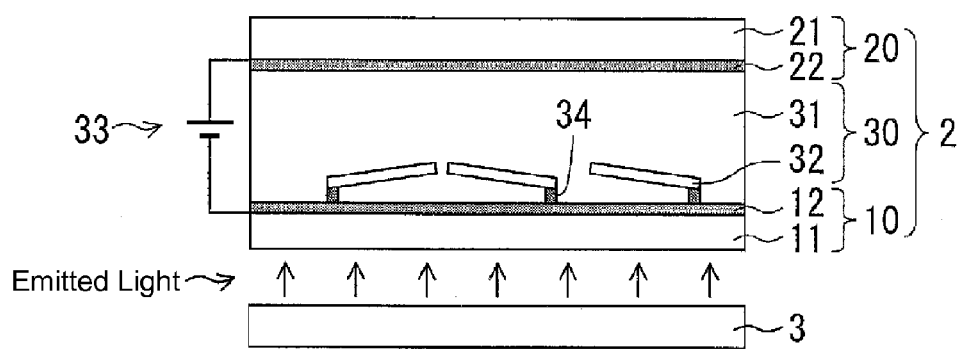
(b)
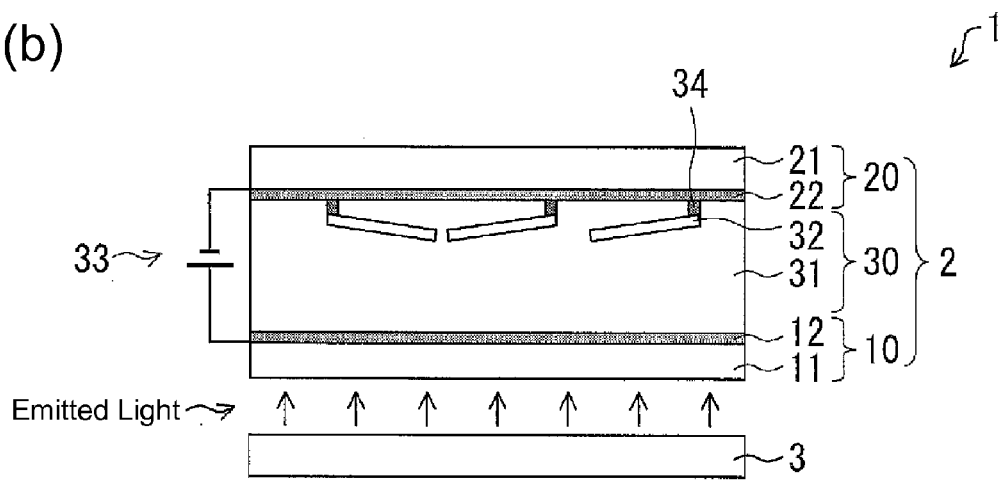

FIG. 6
(a)
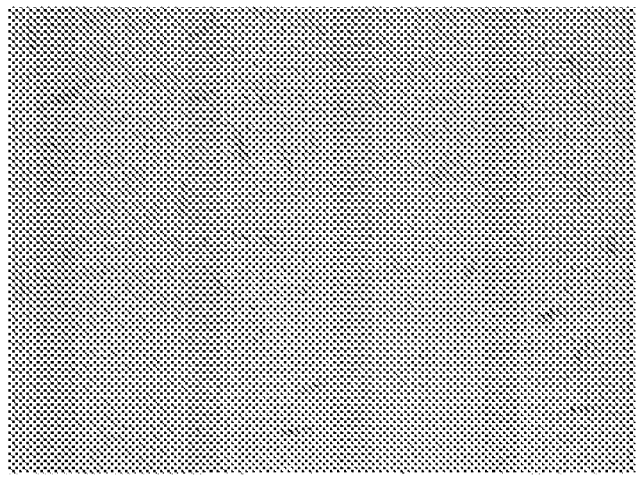
AC : 60Hz 2V
(b)
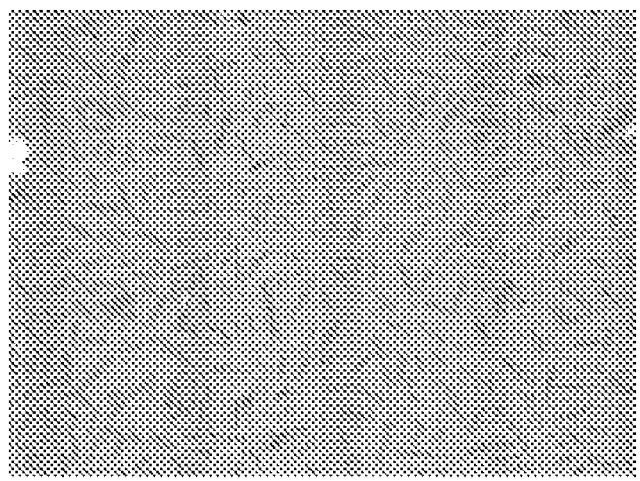
DC : 2V , AC : 60Hz 2V

FIG. 8
(a)
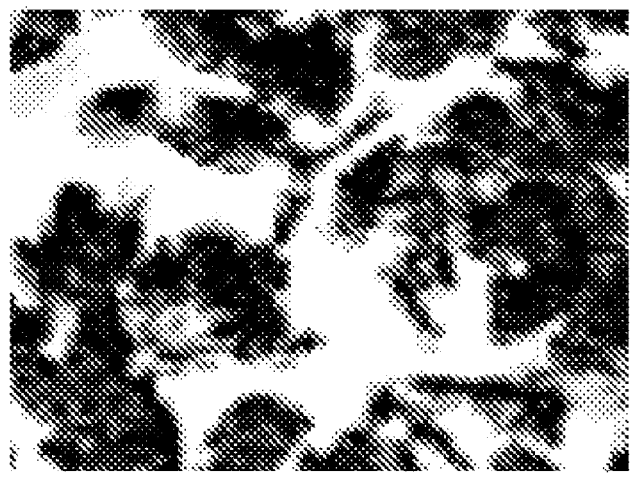
DC : 8V
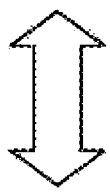
(b)
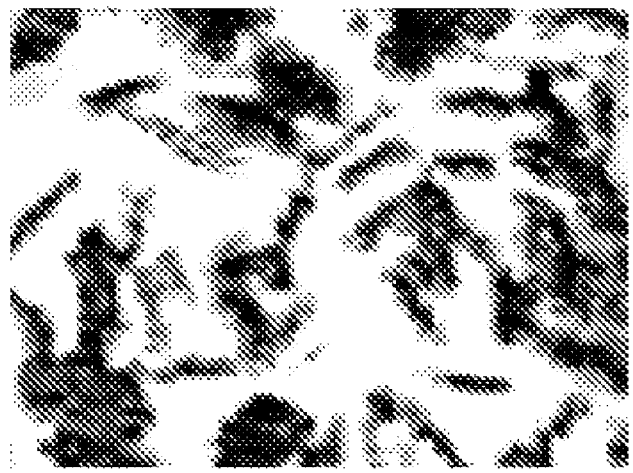
AC : 60Hz 8V

FIG. 9
(a)
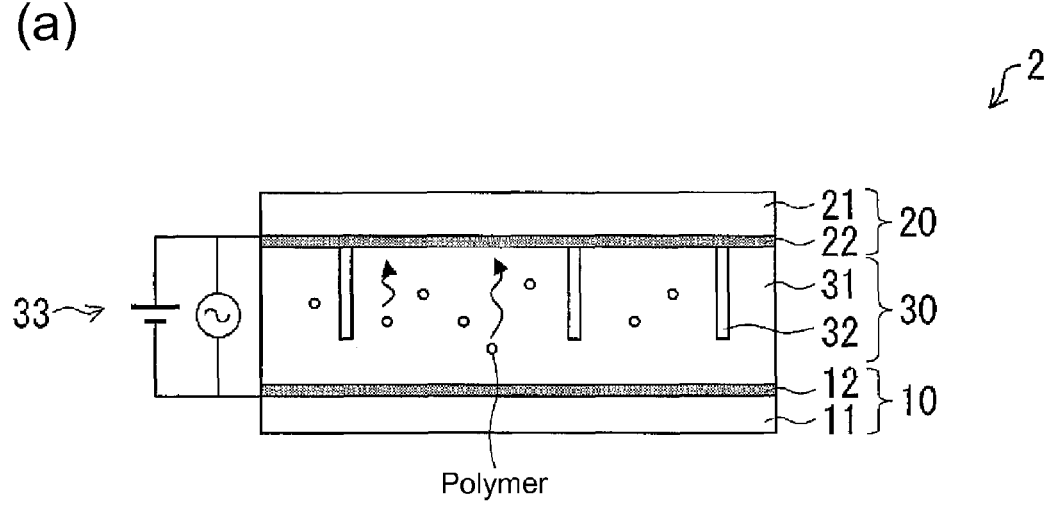
Polymer
(b)
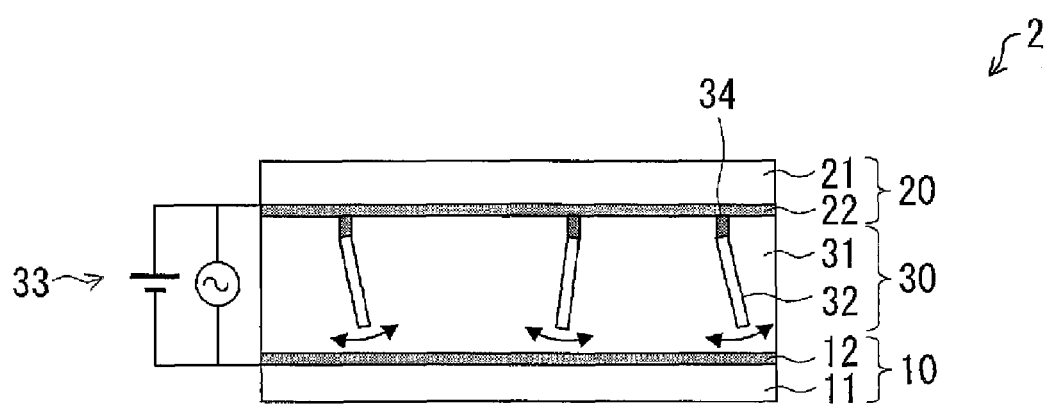

FIG. 10
(a)
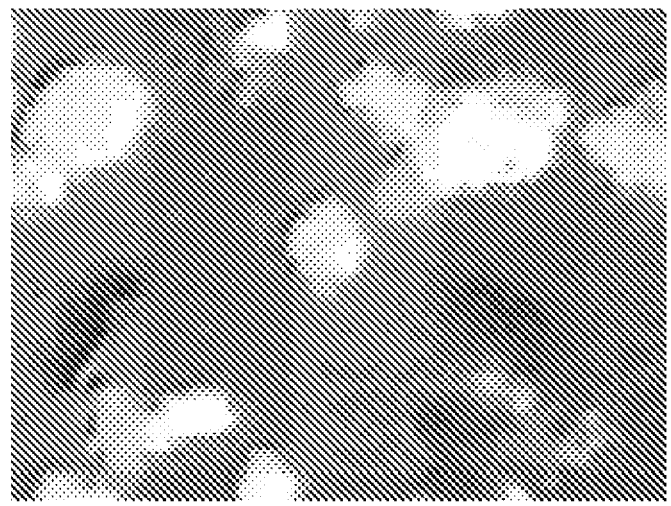
DC:+3V
(b)
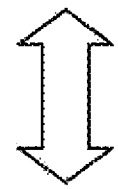
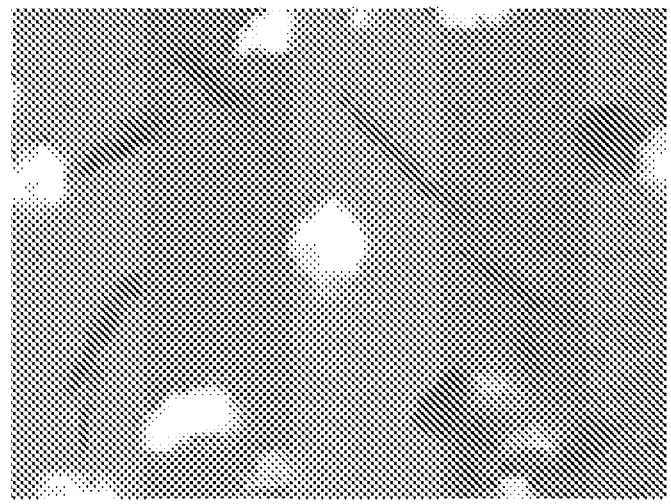
DC:-3V or AC:60Hz 3V

FIG. 11
(a)
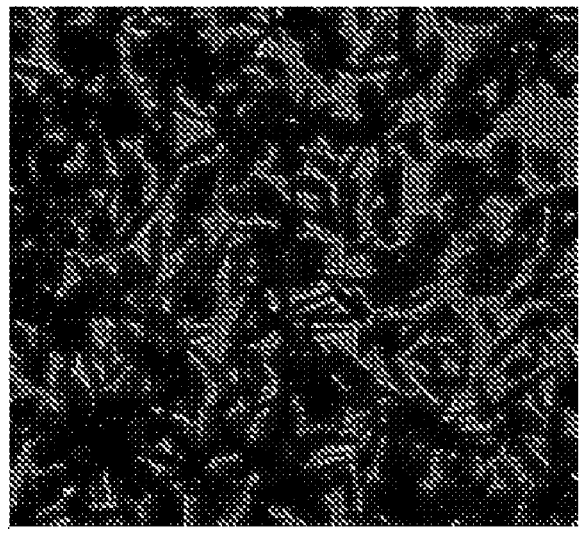
DC : 4V
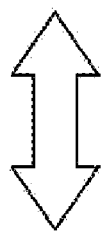
(b)
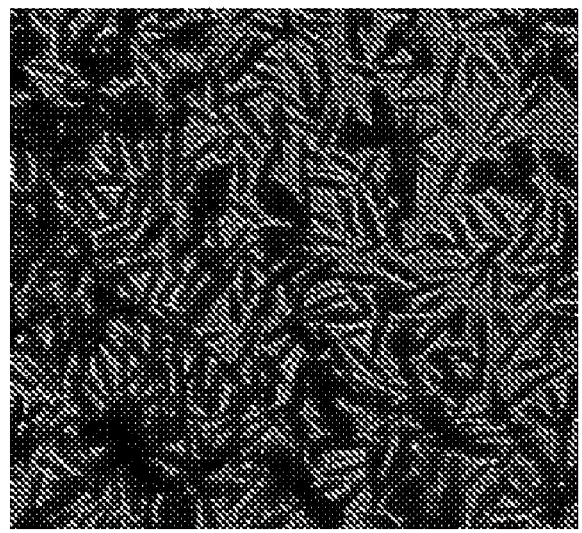
AC : 60Hz 1.5V

FIG. 13
(a)
DC:3V
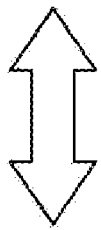
(b)
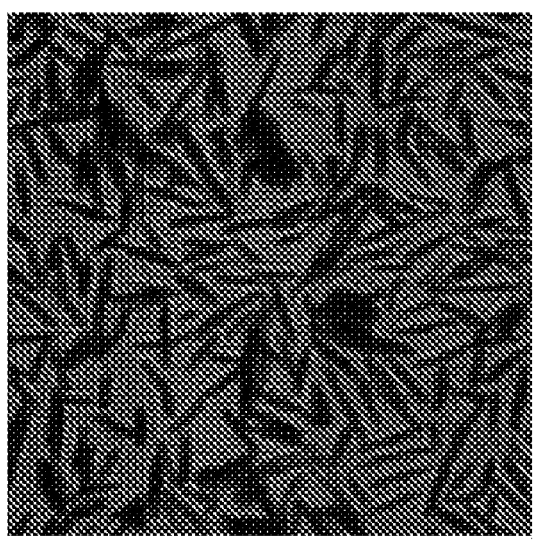
AC:60Hz 1.5V

FIG. 14

| Example | Monomer | Display Panel |
|---|---|---|
| Working Example 3 | •2,2',3,3'-tetrafluoro-4,4'-di-(8-acryloyloxyoctyl) oxy-biphenyl: 0.05 wt% | Operated using a 1.5V, 60 Hz AC voltage and a 4V DC voltage |
| Working Example 4 | •Polyethylene glycol #600 diacrylate: 0.04 wt%<br>•Tricyclodecane dimethanol diacrylate: 0.01 wt% | Operated using a 1.5V, 60 Hz AC voltage and a 3V DC voltage |
| Working Example 5 | •Polyethylene glycol #600 diacrylate: 0.04 wt%<br>•4,4'-diacryloyloxybiphenyl: 0.01 wt% | Operated using a 1.5V, 60 Hz AC voltage and a 3V DC voltage |
| Comparison Example 1 | •Polyethylene glycol #600 diacrylate: 0.05 wt% | Flakes could not be fixed |
| Comparison Example 1 | •Polyethylene glycol #600 diacrylate: 1 wt% | Flakes could not be fixed |
| Comparison Example 2 | •Polyethylene glycol #600 diacrylate: 0.04 wt%<br>•2,2',3,3'-tetrafluoro-4,4'-di-(8-acryloyloxyoctyl) oxy-biphenyl: 0.01 wt% | Flakes could not be fixed |

FIG. 15
(a)
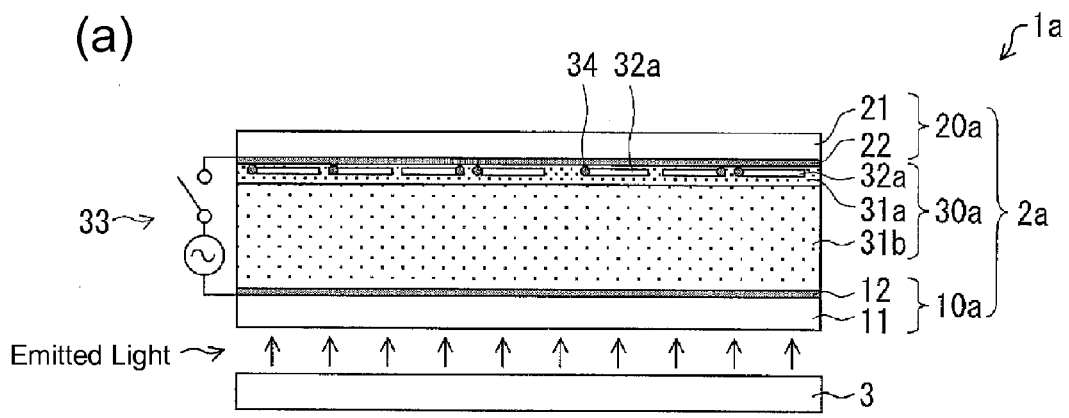
(b)
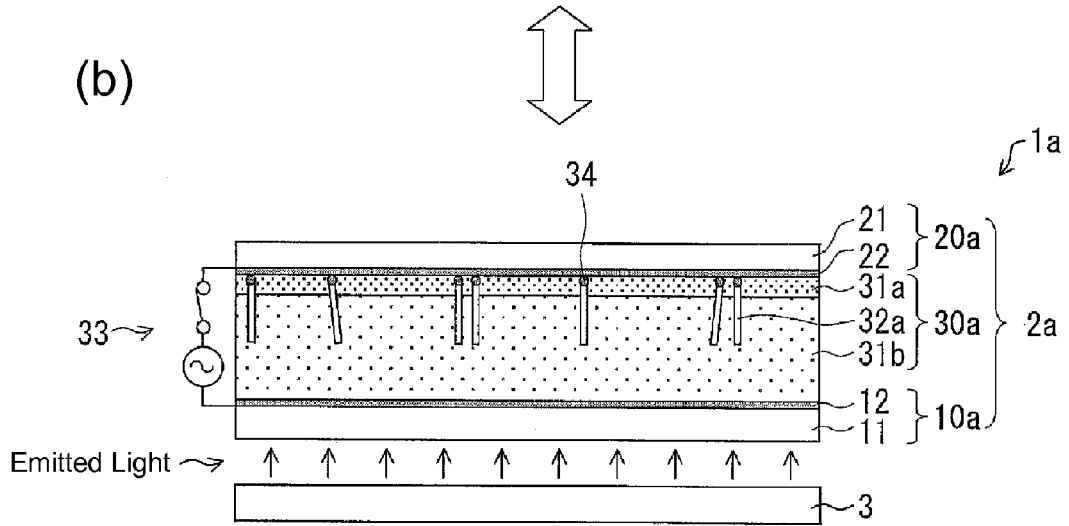

FIG. 16
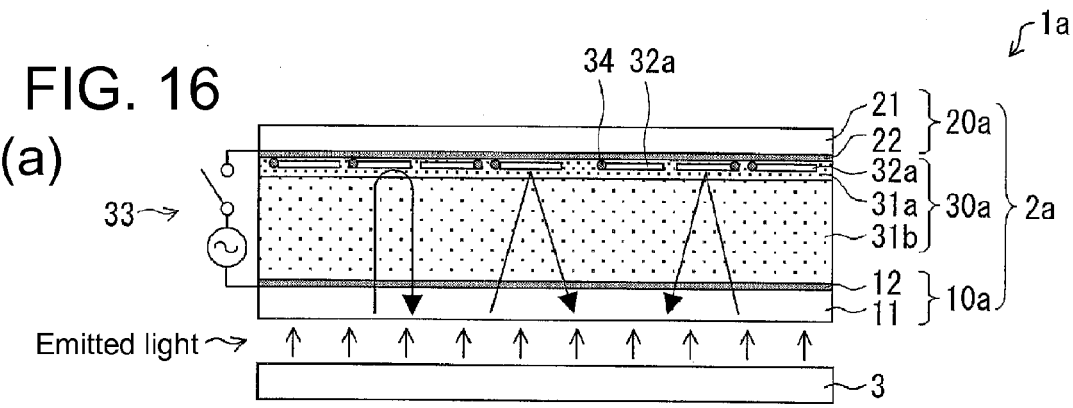
(a)
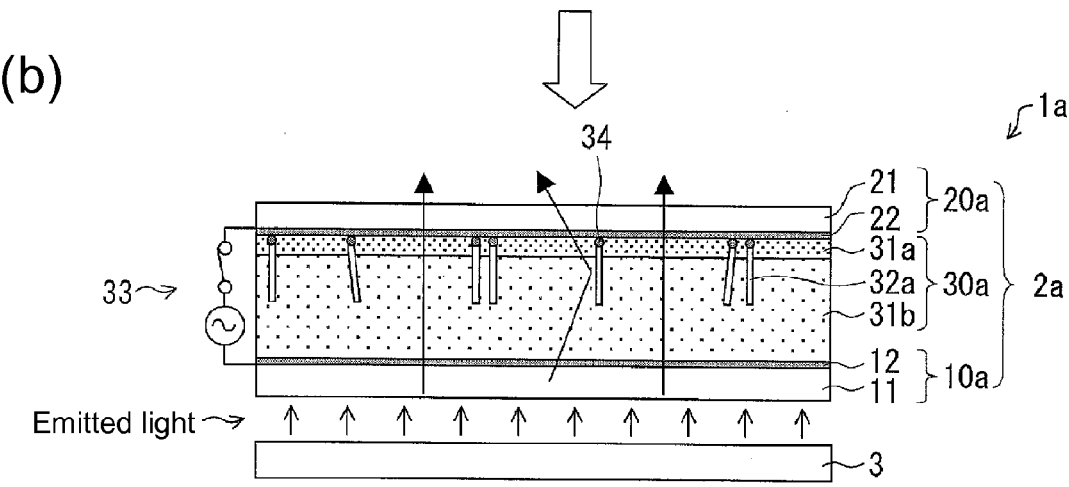
(b)
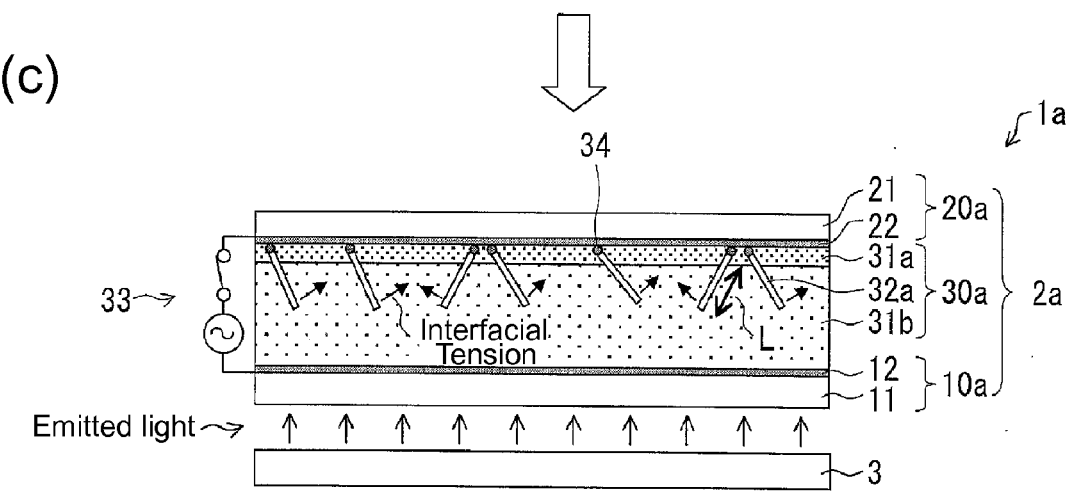
(c)

FIG. 17
(a)
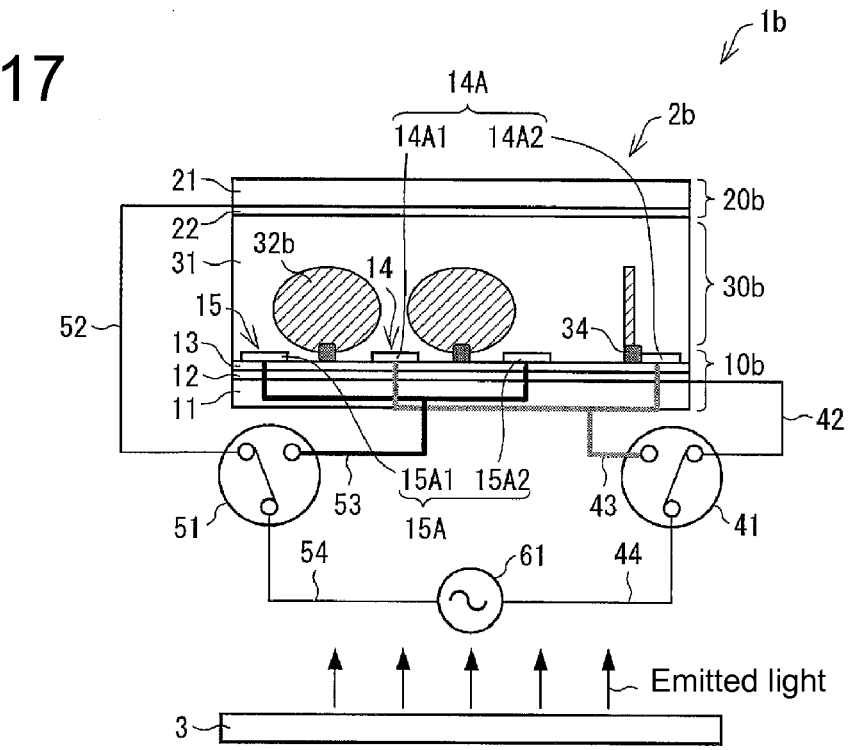
(b)
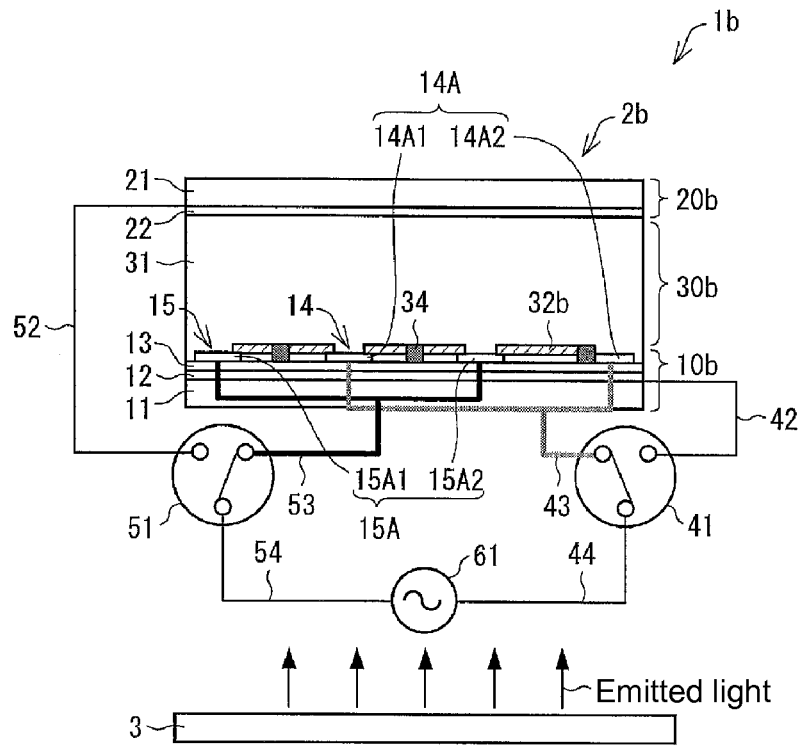

FIG. 19
(a)
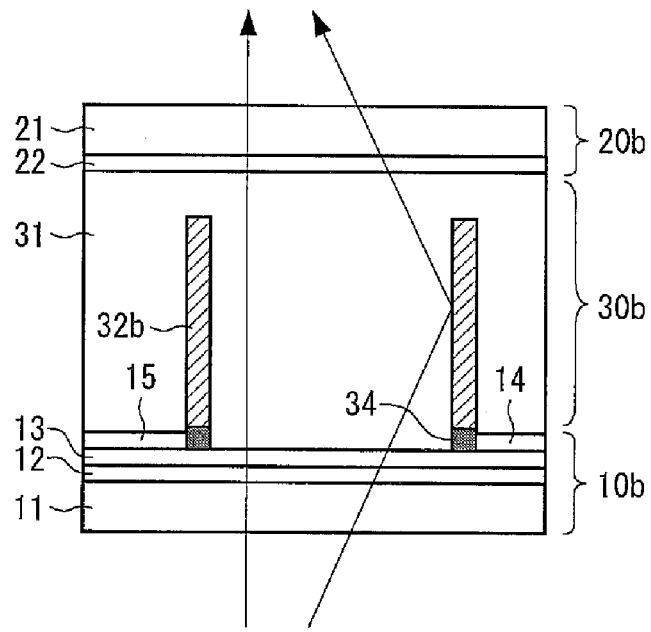
(b)
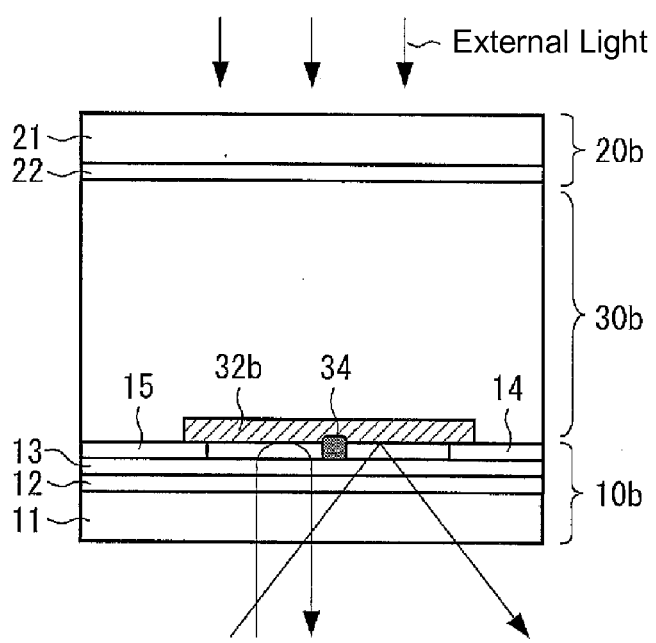

FIG. 20
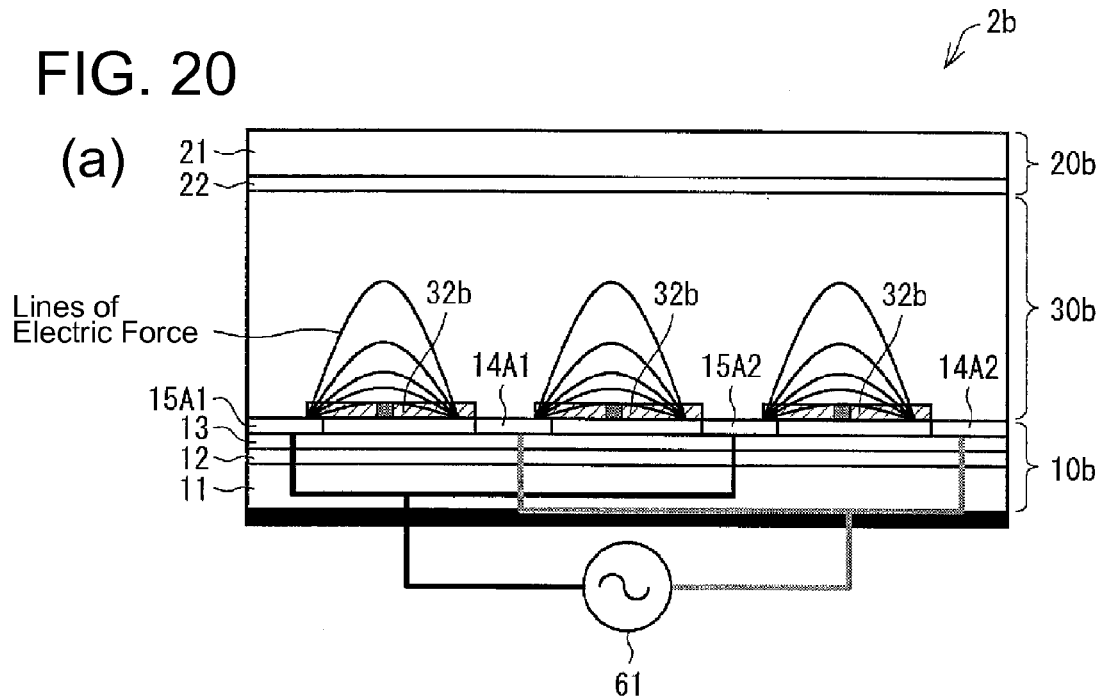
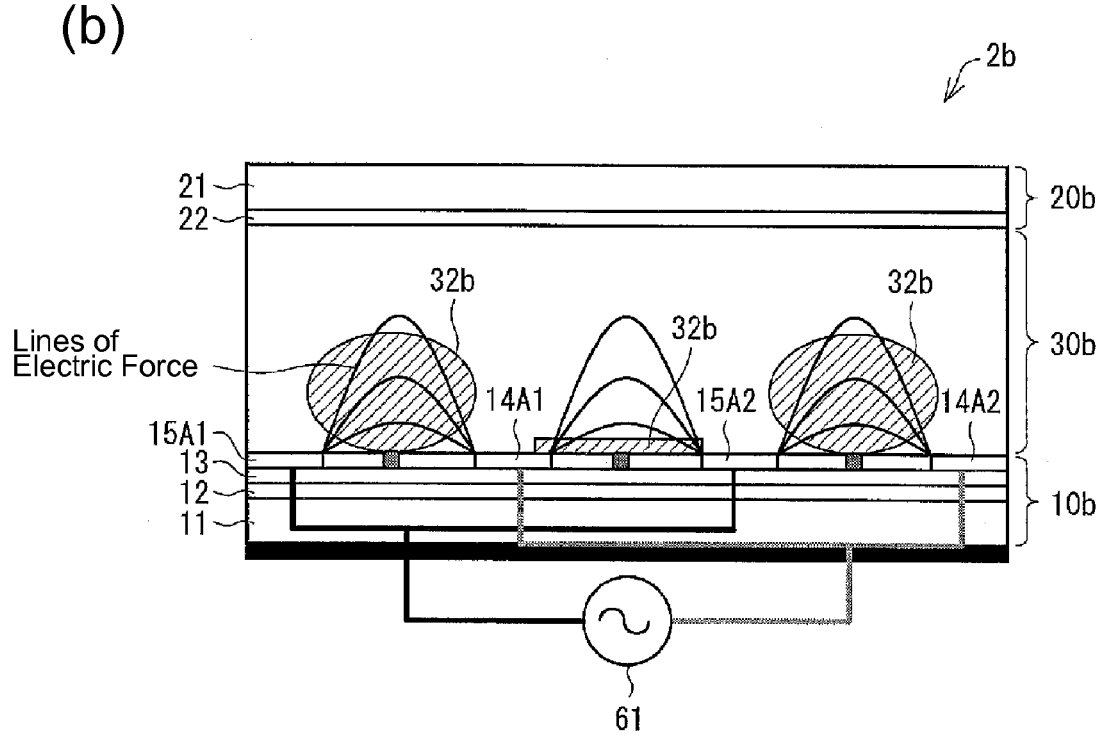

FIG. 21
(a)
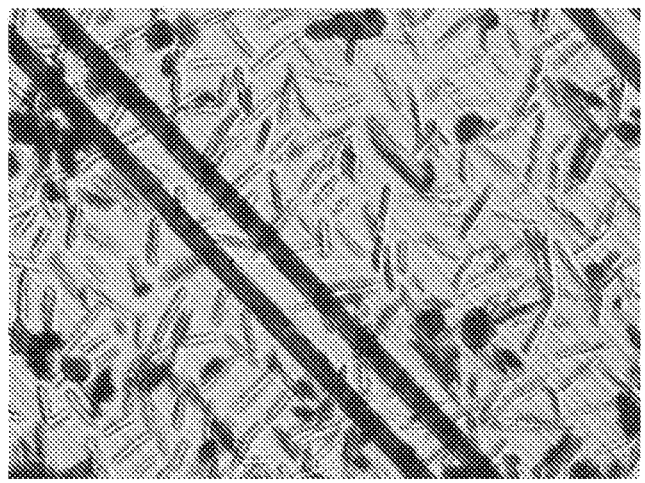
(b)
(c)
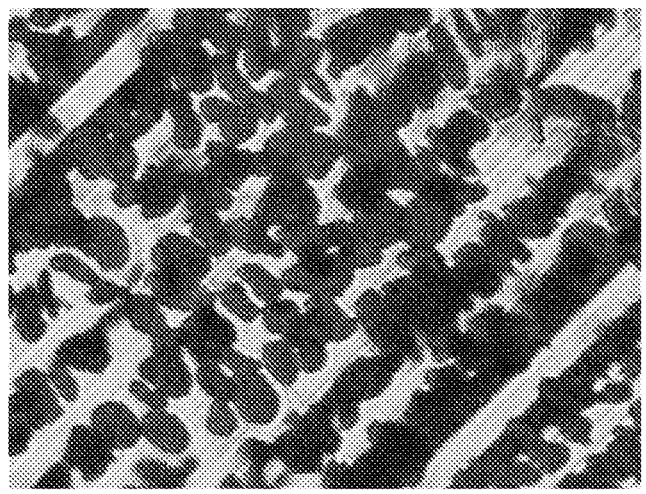

FIG. 22
(a)
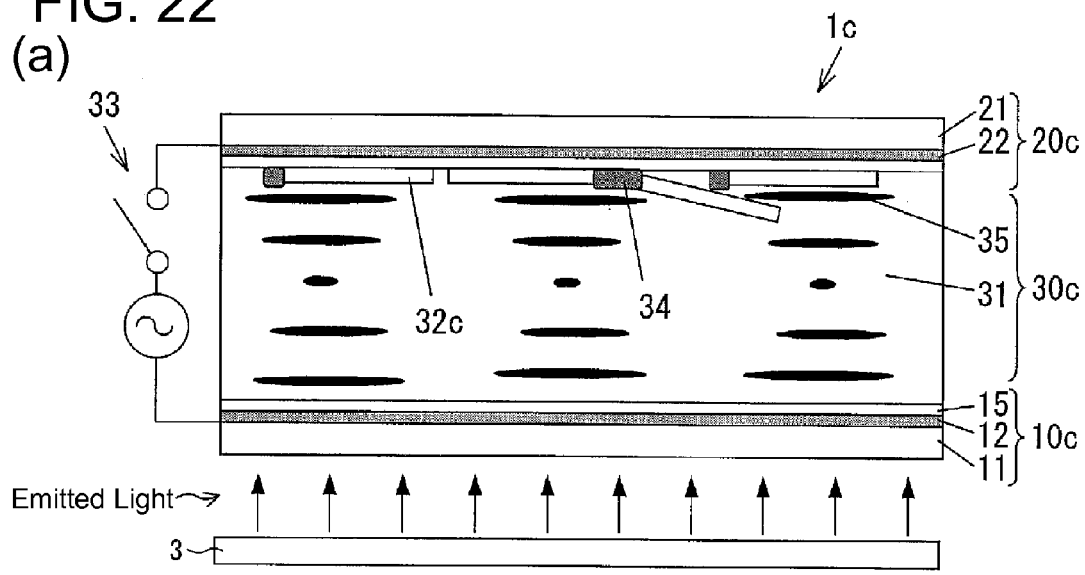
(b)
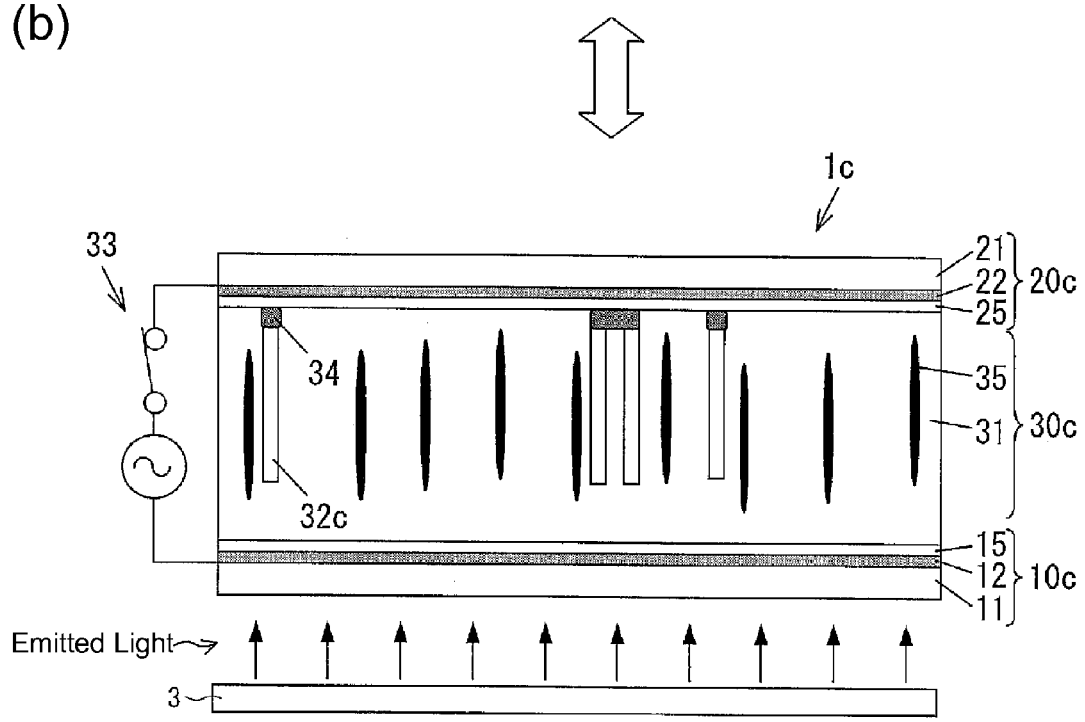

(a) V=0              (b) V=V$_{app}$

FIG. 24
(a)
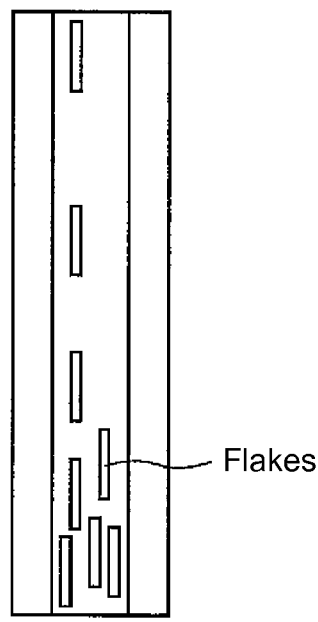
(b)
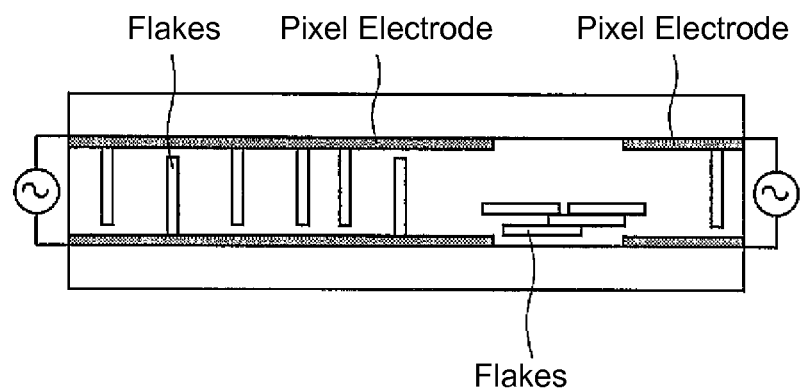

DISPLAY PANEL, DISPLAY DEVICE, AND METHOD FOR MANUFACTURING DISPLAY PANEL

TECHNICAL FIELD

The present invention relates to a display panel and to a display device.

BACKGROUND ART

Most conventional liquid crystal display panels include a pair of glass substrates, a liquid crystal layer provided between the substrates, electrodes provided on each glass substrate, and polarizing plates fixed to each glass substrate. In this type of liquid crystal display panel, light emitted from the backlight passes through the polarizing plates and liquid crystal layer to create an image on the screen that is recognized according to the contrast that appears on the screen. However, much of the light from the backlight is lost before it reaches the screen due to absorption and reflection, thereby reducing the light use efficiency of the display panel. Loss of light due to the polarizing plates accounts for a particularly large reduction in light use efficiency.

As a result, in recent years there has been increased development of light modulating devices, which are different from liquid crystal panels in that polarizing plates are not required (see Patent Documents 1 and 2, for example).

FIG. 23 shows cross-sectional views that illustrate the principle of operation of a light modulating device (optical device) disclosed in Patent Document 1. FIG. 23(a) is a cross-sectional view that shows the light absorbing state, and FIG. 23(b) is a cross-sectional view that shows the light reflecting state. The optical device disclosed in Patent Document 1 has a configuration in which polymer flakes are suspended in a liquid host (medium), and the optical characteristics of those flakes are selectively modified by changing the applied voltage.

When nematic liquid crystals are used as the liquid host, for example, applying an AC voltage to the optical device causes the liquid host to orient parallel to the electric field E, which in turn causes the flakes to orient in the liquid host alignment direction.

The configuration of this optical device removes the need for polarizing plates and can therefore increase light use efficiency in comparison with a liquid crystal panel.

RELATED ART DOCUMENTS

Patent Documents

Patent Document 1: U.S. Pat. No. 6,665,042 (Published on Dec. 16, 2003)
Patent Document 2: U.S. Pat. No. 6,829,075 (Published on Dec. 7, 2004)

SUMMARY OF THE INVENTION

Problems to be Solved by the Invention

However, the optical device of Patent Document 1 has no unit for restricting in-plane movement of the flakes suspended in the liquid host and is therefore prone to display anomalies due to non-uniform in-plane flake behavior.

FIGS. 24(a) and 24(b) schematically illustrate principles by which display anomalies could manifest. If the flakes and medium had a different specific gravity and the optical device (display device) was stood upright and maintained in that orientation, for example, the flakes would settle towards the bottom of the display device, reducing the amount of flakes near the top of the device and creating a region in which nothing would be displayed. Moreover, even if the flakes and medium had the same specific gravity, the flakes would still move in-plane due to differences in the strength of the electric fields between the areas where the electric field is weak such as those where a pixel electrode is not provided and the areas where the electric field is strong because a pixel electrode is provided nearby, thereby causing display irregularities.

The present invention was made in view of such problems, and aims to provide a display panel, a display device, and method for manufacturing a display panel with which light use efficiency can be increased and occurrence of display anomalies can be decreased.

Means for Solving the Problems

In order to solve the abovementioned problems, the present display panel includes:
a first substrate and a second substrate facing each other;
a light modulating layer between the first substrate and the second substrate having a plurality of shape-anisotropic members that rotate in accordance with a direction of an electric field, the light modulating layer controlling transmittance of incident light by changing an area projected onto a plane parallel to the first substrate and the second substrate by the shape-anisotropic members; and
one or more supporting members provided on the first substrate or the second substrate to support the respective shape-anisotropic members,
wherein the shape-anisotropic members are rotatably connected to the respective supporting members.

Moreover, in order to solve the abovementioned problems, a method for manufacturing a display panel having a first substrate and a second substrate facing each other and a light modulating layer between the first substrate and the second substrate having a plurality of shape-anisotropic members that rotate in accordance with a direction of an electric field, the light modulating layer controlling transmittance of incident light by changing an area projected onto a plane parallel to the first substrate and the second substrate by the shape-anisotropic members, includes:
injecting, between the first substrate and the second substrate, a photocurable resin material and a medium into which the shape-anisotropic members are mixed;
applying a voltage in between the first substrate and the second substrate after the step of injecting; and
irradiating the display panel with ultraviolet light after the applying a voltage step.

Effects of the Invention

The present display panel is provided with one or more supporting members formed on the first substrate or the second substrate to support each of the shape-anisotropic members, and each of the shape-anisotropic members are rotatably connected to one of the supporting members. This configuration makes it possible to provide a display panel with increased light use efficiency and decreased occurrence of display anomalies.

BRIEF DESCRIPTION OF THE DRAWINGS

FIGS. 2(a) to 2(c) are cross-sectional views and FIGS. 2(d) and 2(e) are plan views schematically illustrating a configuration of the display device according to Embodiment 1.

FIG. 4(a) is an image taken in plan view when the flakes are horizontally aligned, and FIG. 4(b) is an image taken in plan view when the flakes are vertically aligned.

FIGS. 5(a) and 5(b) are cross-sectional views showing a modification example of the display device shown in FIG. 1.

FIGS. 6(a) and 6(b) are images taken in plan view when the flakes are vertically aligned in Working Example 1.

FIG. 8(a) is an image taken in plan view when the flakes are horizontally aligned in Working Example 1, and FIG. 8(b) is an image taken in plan view when the flakes are vertically aligned in Working Example 1.

FIGS. 9(a) and 9(b) are images taken in plan view when the flakes are vertically aligned in Working Example 2.

FIG. 10(a) is an image taken in plan view when the flakes are horizontally aligned in Working Example 2, and FIG. 10(b) is an image taken in plan view when the flakes are vertically aligned in Working Example 2.

FIG. 11(a) is an image taken in plan view when the flakes are horizontally aligned in Working Example 3, and FIG. 11(b) is an image taken in plan view when the flakes are vertically aligned in Working Example 3.

FIG. 13(a) is an image taken in plan view when the flakes are horizontally aligned in Working Example 4, and FIG. 13(b) is an image taken in plan view when the flakes are vertically aligned in Working Example 4.

FIG. 14 is a table describing the display panels of Working Examples 3 to 5 and Comparison Examples 1 and 2.

FIGS. 15(a) and 15(b) are cross-sectional views schematically illustrating a configuration of a display device according to Embodiment 2.

FIG. 16(a) shows the paths that light would take in FIG. 15(a). FIG. 16(b) shows the paths that light would take in FIG. 15(b). FIG. 16(c) shows how the flakes rotate due to interfacial tension between the flakes and a non-polar solvent 31b.

FIGS. 17(a) and 17(b) are cross-sectional views schematically illustrating a configuration of a display device according to Embodiment 3.

FIG. 19(a) is a cross-sectional view of the principal parts of a display panel showing the paths that light would take in FIG. 17(a), and FIG. 19(b) is a cross-sectional view of the principal parts of a display panel showing the paths that light would take in FIG. 17(b).

FIGS. 20(a) and 20(b) are cross-sectional views showing lines of electric force formed between comb-shaped electrodes in the display device shown in FIG. 17.

FIG. 21 contains photomicrographs taken of flake alignment states. FIG. 21(a) shows a case in which a voltage is applied to solid electrodes. FIG. 21(b) shows a case in which a relatively low voltage is applied to comb-shaped electrodes. FIG. 21(c) shows a case in which a relatively high voltage is applied to comb-shaped electrodes.

FIGS. 22(a) and 22(b) are cross-sectional views schematically illustrating a configuration of a display device according to Embodiment 4.

FIGS. 24(a) and 24(b) schematically illustrate principles by which display anomalies could manifest in conventional optical devices.

DETAILED DESCRIPTION OF EMBODIMENTS

Embodiment 1

A display device according to Embodiment 1 of the present invention will be described below with reference to figures.

Figure 1:
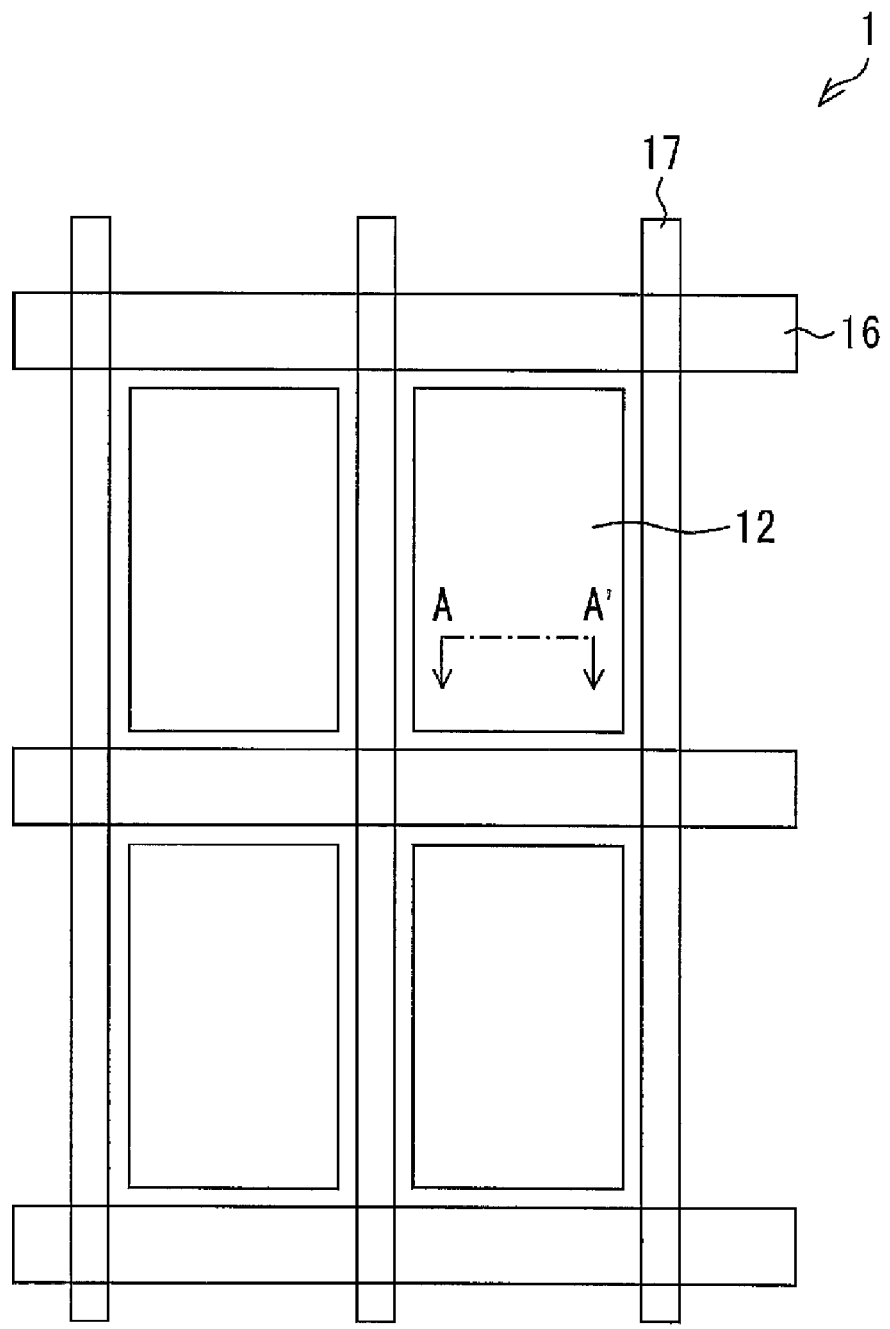
FIG. 1 is a plan view schematically illustrating a configuration of a display device according to Embodiment 1.

FIG. 1 is a plan view schematically illustrating a configuration of a display device 1 according to Embodiment 1. The display device 1 includes a plurality of scan signal lines 16 (which run horizontally in FIG. 1), a plurality of data signal lines 17 (which run vertically in FIG. 1), and pixels provided at the intersections between the scan signal lines 16 and the data signal lines 17. An electrode 12 (pixel electrode) is provided for each pixel.

FIGS. 2(a) and 2(b) are cross-sectional views taken along line A-A' in FIG. 1 which schematically illustrate a configuration of the display device 1 according to Embodiment 1. FIG. 2(d) is a plan view of the case shown in FIG. 2(a), and FIG. 2(e) is a plan view of the case shown in FIG. 2(b). The display device 1 includes a display panel 2, a backlight 3 that illuminates the display panel 2, and drive circuits (not shown in the figure). The display device 1 is a transmissive display device in which light from the backlight 3 passes through the display panel 2 to display an image.

A conventional backlight is used for the backlight 3. The description of the backlight 3 is therefore omitted here. An edge-lit or direct-lit surface light source device or the like can be used as appropriate for the backlight 3, for example. Moreover, fluorescent tubes, LEDs, or the like can be used as appropriate as the light source for the backlight 3.

The display panel 2 includes a pair of substrates 10 and 20 disposed oppositely to one another as well as a light modulating layer 30 provided in between the pair of substrates 10 and 20. The first substrate 10 is provided on the rear side (near the backlight 3) of the display device, and the second substrate 20 is provided on the display surface side (viewer side) of the display device. Moreover, the display panel 2 includes a large number of pixels arranged in a matrix pattern.

The substrates 10 and 20 each include an insulating substrate such as a transparent glass substrate, for example. The substrates 10 and 20 also include electrodes 12 and 22, respectively.

The substrate 10 is an active matrix substrate. More specifically, the substrate 10 includes a glass substrate 11 on which the signal lines (the scan signal lines 16, the data signal lines 17, and the like), thin film transistors (TFTs) (not shown in the figure), an insulating film (not shown in the figure), and the electrodes 12 (pixel electrodes) are provided in order. Conventional drive circuits are used for the drive circuits for driving the signal lines (the scan signal line driver circuit, the data signal line drive circuit, and the like).

The substrate 20 includes a glass substrate 21, on which the electrode 22 (common electrode) is provided.

The electrodes 12 of the substrate 10 and the electrode 22 of the substrate 20 are formed using a transparent conductive film made from a material such as indium tin oxide (ITO), indium zinc oxide (IZO), zinc oxide, or tin oxide. Moreover, the electrode 12 is formed for each pixel, and the electrode 22 is formed in a solid shape to make the electrode 22 the common electrode for all of the pixels. It should also be noted that the electrode 22 may be formed for each pixel like the electrode 12.

The light modulating layer 30 is provided between the electrodes 12 and 22 and includes a medium 31, a plurality of shape-anisotropic members 32 contained in the medium 31, and supporting members 34. A voltage is applied to the light modulating layer 30 using a power source 33 connected to the electrodes 12 and 22, and the transmittance of light from the backlight 3 that enters the light modulating layer 30 is controlled by changing the magnitude or frequency of the applied voltage. In this description, an AC voltage with a frequency of 0 Hz is referred to as a "DC voltage". The thickness of the light modulating layer 30 (cell thickness) is determined according to the length of the long axes of the shape-anisotropic members 32 and is set to 80 μm, for example.

The supporting members 34 are formed on the electrode 22 of the substrate 20 using a resin. The configuration of the supporting members 34 will be described in detail below.

The shape-anisotropic members 32 are shape-anisotropic, responsive members that rotate or deform according to the direction of the electric field applied. Moreover, one end of each of the shape-anisotropic members 32 is connected to one of the supporting members 34 such that the shape-anisotropic members 32 can rotate (or deform) around the supporting members 34 (which serve as fulcrums). It should be noted that there may be a one-to-one relationship between the shape-anisotropic members 32 and the supporting members 34. Alternatively, a plurality of shape-anisotropic members 32 may be connected to each supporting member 34. Furthermore, each of the shape-anisotropic members 32 may be connected to a single supporting member 34 formed in a solid shape that covers the entire surface of the substrate 20.

In terms of display properties, the area of the image projected onto the substrates 10 and 20 by the shape-anisotropic members 32 (the area projected onto the substrates 10 and 20 by the shape-anisotropic members 32) when viewed from the normal direction can be changed by changing the magnitude or frequency of the applied voltage. In addition, it is preferable that the ratio of the maximum projected area to the minimum projected area (the projected area ratio) be 2:1 or greater.

Moreover, the shape-anisotropic members 32 may be charged positively or negatively in the medium 31. More specifically, members that can exchange electrons with the electrodes or the medium or the like, or members to which an ionic silane coupling agent or the like has been applied can be used for the shape-anisotropic members 32, for example.

Moreover, shapes such as a flake shape, a cylindrical shape, or an ellipsoidal shape can be used as the shape for the shape-anisotropic members 32, for example. A metal material, semiconductor material, dielectric material, or a composite formed using these materials can be used as the material for the shape-anisotropic members 32. Alternatively, a multi-layer dielectric film or a cholesteric resin can be used as the material for the shape-anisotropic members 32. Furthermore, when a metal is to be used for the shape-anisotropic members 32, aluminum flakes of the type used for general coating purposes can be used. Moreover, the shape-anisotropic members 32 may be colored. For example, aluminum flakes with a diameter of 20 μm and a thickness of 0.3 μm can be used for the shape-anisotropic members 32.

Moreover, it is preferable that the specific gravity of the shape-anisotropic members 32 be 11 g/cm$^3$ or less. It is more preferable that the specific gravity of the shape-anisotropic members 32 be 3 g/cm$^3$ or less and that the medium 31 have the same specific gravity. This is because if specific gravity of the shape-anisotropic members 32 is much larger or smaller than the specific gravity of the medium 31, the shape-anisotropic members 32 tend to settle or rise within the medium 31.

The medium 31 is a material that transmits light in the visible spectrum. A liquid that exhibits essentially no absorption of light in the visible spectrum, a mixture in which such a liquid is colored using a pigment, or the like can be used for the medium 31. Moreover, it is preferable that the medium 31 have the same specific gravity as the shape-anisotropic members 32.

Moreover, it is preferable that the medium 31 have low volatility in consideration of the process that will be used to seal the medium inside a cell. In addition, the viscosity of the medium 31 should promote the responsiveness of the display device. It is preferable that the viscosity of the medium 31 be 5 mPa·s or less. Furthermore, it is preferable that the viscosity of the medium 31 be 0.5 mPa·s or greater to prevent settling of the shape-anisotropic members 31.

Moreover, the medium 31 may be a single substance or a mixture created using a plurality of substances. Substances such as propylene carbonate, N-methyl-2-pyrrolidone (NMP), a fluorocarbon, or a silicone oil can be used for the medium 31, for example.

Next, a method for controlling the transmittance of light using the light modulating layer 30 will be described in detail. In the following description, flakes are used for the shape-anisotropic members 32.

Figure 3:
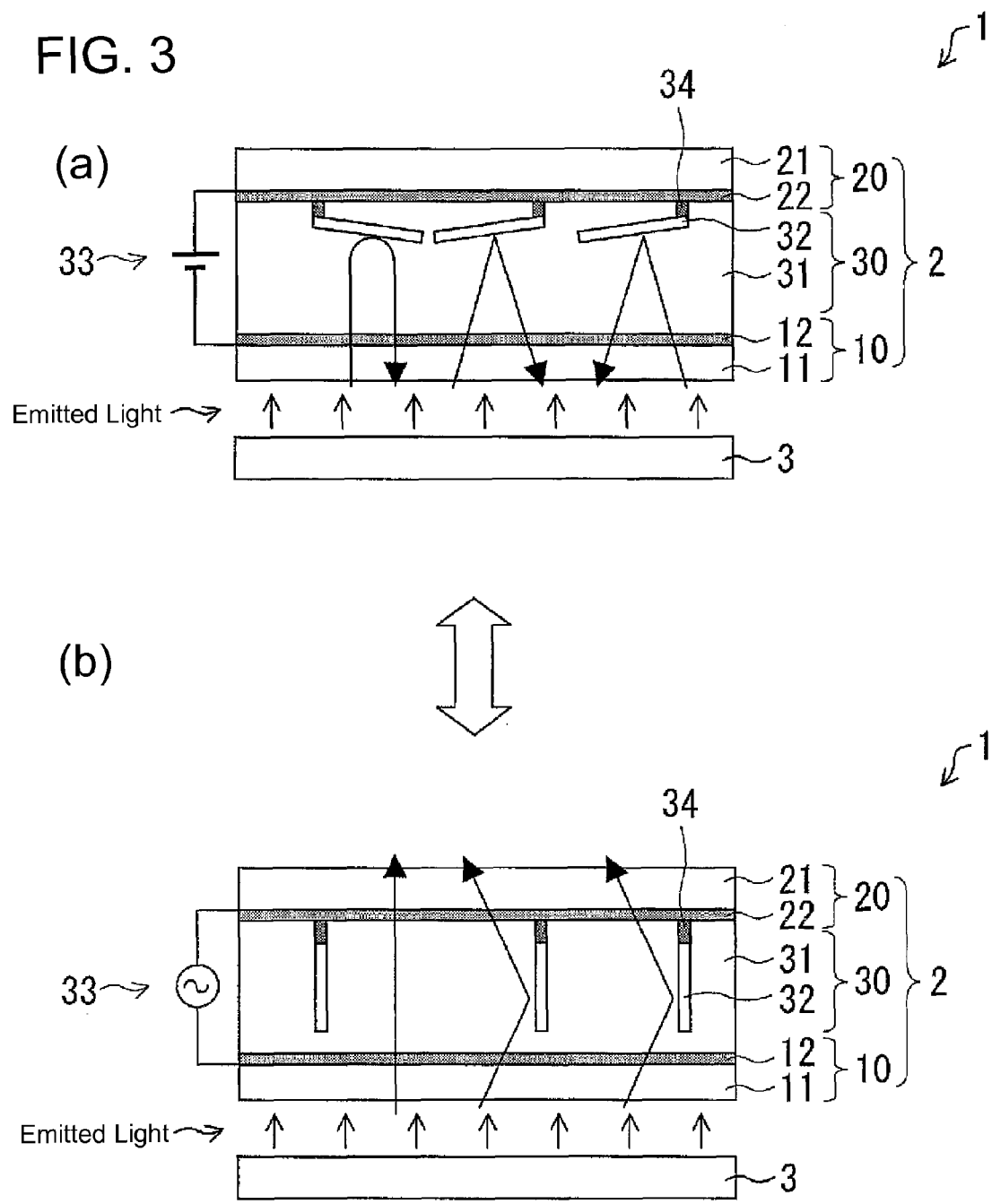
FIG. 3(a) shows the paths that light would take in FIG. 2(a)
FIG. 3(b) shows the paths that light would take in FIG. 2(b).

As shown in FIG. 3(b), when a high frequency AC voltage with a magnitude of 8V and a frequency of 60 Hz, for example, is applied to the light modulating layer 30, the flakes rotate around the supporting members 34 (which serve as fulcrums) such that the long axes of the flakes become parallel to the lines of electric force. This rotation occurs due to dielectrophoresis and forces governed by Coulomb's law or other laws of electrical energy. In other words, the flakes orient such that the long axes thereof are perpendicular to the substrates 10 and 20. This state is also called "vertical alignment" below. In this state, light from the backlight 3 that enters the light modulating layer 30 passes therethrough and exits on the viewer side of the display device.

In this case, if a material that reflects visible light (such as pieces of metal such as aluminum flakes, for example) is used for the flakes, aligning the flakes vertically such that the reflection plane is perpendicular to the substrates 10 and 20 makes any incident light on the light modulating layer 30 either pass directly therethrough or reflect off the flakes and continue towards the surface opposite to the side from which the light came (that is, towards the display surface side).

Meanwhile, when either a low frequency AC voltage with a magnitude of 8V and a frequency such as 0.1 Hz or a DC voltage with a magnitude of 8V (and a frequency of 0 Hz), for example, is applied to the light modulating layer 30, the charged flakes are drawn towards the electrode with the opposite electric charge due to electrophoresis and forces governed by Coulomb's law. The flakes then rotate around the supporting members 34 (which serve as fulcrums) and cling to the substrate 10 or the substrate 20, thereby achieving the most stable orientation. FIG. 3(a) shows an example case in which a DC voltage is applied to the light modulating layer 30. The electrode 22 of the substrate 20 is charged positively, and the flakes are charged negatively. The difference in charge polarity causes the flakes to orient such that they cling to the substrate 20. In other words, the flakes orient such that the long axes thereof are parallel to the substrates 10 and 20. This state is also called "horizontal alignment" below. In this state, light from the backlight 3 that would have entered the light modulating layer 30 is blocked by the flakes and therefore does not pass through the light modulating layer 30.

By switching the voltage applied to the light modulating layer 30 between an AC voltage and a DC voltage with a frequency of 0 Hz or between a high frequency AC voltage and a low frequency AC voltage in this manner, the transmittance of light from the backlight 3 that enters the light modulating layer 30 (that is, the amount of light transmitted through the light modulating layer) can be changed. Moreover, a voltage with a frequency of 0 to 0.5 Hz, for example, is applied to make the flakes orient horizontally. A voltage with a frequency of 30 Hz to 1 kHz, for example, is applied to make the flakes orient vertically. These frequencies are set in advance according to the shape and material used for the flakes (the shape-anisotropic members 32), the thickness of the light modulating layer 30 (the cell thickness), and the like. That is, the display device 1 has a configuration in which the transmittance of light can be changed by switching the frequency of the voltage applied to the light modulating layer 30 between a low frequency that is less than or equal to a first threshold value and a high frequency that is greater than or equal to a second threshold value. Here, the first threshold value can be set to 0.5 Hz and the second threshold value can be set to 30 Hz, for example.

Moreover, because part of each flake (each shape-anisotropic member 32) is rotatably connected to one of the supporting members 34, the flakes do not exhibit non-uniform in-plane behavior of the type found in conventional technologies (see FIG. 24). As a result, the present embodiment can reduce the occurrence of problems found in conventional display technologies, such as display irregularities and regions in which nothing is displayed.

When flakes are used for the shape-anisotropic members 32, it is preferable that the thickness of the flakes be 1 μm or less, and it is more preferable that the thickness of the flakes be 0.1 μm or less. The thinner the flakes are, the more the transmittance of the display device can be increased.

FIG. 4(a) is an image taken in plan view when the flakes are horizontally aligned, and FIG. 4(b) is an image taken in plan view when the flakes are vertically aligned. Here, propylene carbonate was used for the medium 31, and aluminum flakes with a diameter of 20 μm and a thickness of 0.3 μm were used for the shape-anisotropic members 32. The cell thickness was set to 79 μm, and the magnitude of the applied voltage was set to 5.0V (AC voltage). The frequency of the applied voltage was switched between 0 Hz (DC voltage) and 60 Hz. As shown in FIG. 4(a), the flakes orient horizontally when the frequency is set to 0 Hz (DC voltage). As shown in FIG. 4(b), the flakes orient vertically when the frequency is set to 60 Hz (the high frequency).

It should also be noted that in FIG. 2(a), the supporting members 34 are provided on the electrode 22 of the substrate 20, the negative terminal of the power source 33 is connected to the electrode 12, and the positive terminal of the power source 33 is connected to the electrode 22. However, the present embodiment is not limited to this configuration. As shown in FIG. 2(c), the supporting members 34 may be provided on the electrode 12 of the substrate 10, the negative terminal of the power source 33 may be connected to the electrode 22, and the positive terminal of the power source 33 may be connected to the electrode 12. In the configuration shown in FIG. 2(c), the flakes rotate around the supporting members 34 (which serve as fulcrums) on the substrate 10 and then cling to the substrate 10. FIG. 2 shows a case in which the flakes are charged negatively. However, the present embodiment is not limited to this charging scheme, and the flakes may also be charged positively. FIGS. 5(a) and 5(b) depict the cases in which the flakes are charged oppositely to the cases depicted in FIGS. 2(a) and 2(c) and therefore cling to the opposite substrates.

Working Example 1

A working example of the flakes (shape-anisotropic members 32) and the supporting members 34 will be described below.

If the entire body of each flake is connected to one of the supporting members 34, the flakes cannot rotate when a voltage is applied. Therefore, only a part (or point or side) of each flake is connected to one of the supporting members 34. Here, "a part of each flake" refers to a region having a non-zero width. This width can be determined based on the elasticity, rigidity, or adhesive properties of the resin material in the light modulating layer 30 and should be at least wide enough that the flakes can rotate when a voltage is applied and also wide enough that the flakes do not easily become detached and fall off due to repeated rotation. "A part of each flake" can be a circular region having a diameter equal to the thickness of the flakes, for example. A method for manufacturing the display panel 2 will be described below.

First, aluminum flakes (the shape-anisotropic members) with an average particle diameter of 7 μm and a thickness of 0.1 μm and the photocurable resin material A-784-180 (brand name) (Sekisui Chemical Co., Ltd.) were mixed in a medium such as propylene carbonate such that the mixture was 1 wt % aluminum flakes and 0.5 wt % A-784-180, for example. This mixture was then injected into a cell having a cell gap of 90 μm (injection step). Next, as shown in the reflection photomicrograph in FIG. 6(a), a 2V, 60 Hz AC voltage was applied to the cell to orient the flakes vertically in a state in which the position of the flakes was not regulated in the cell thickness direction (voltage applying step). It should be noted that in this photomicrograph, the microscope was focused near a transparent electrode of the substrate 20, which was positioned at the top of the cell. Flakes farther away from this focal point are not captured clearly in the image.

Figure 7:
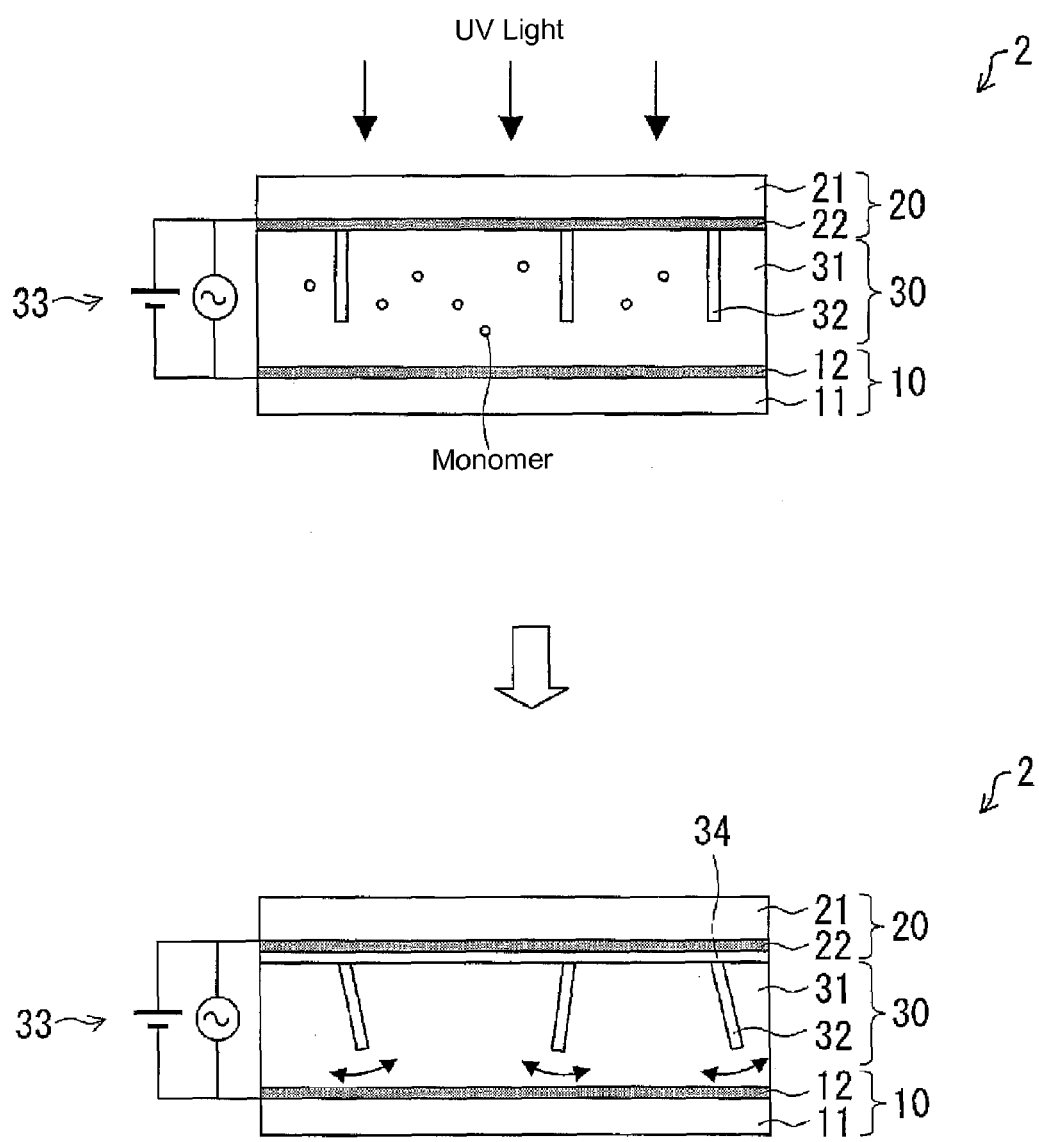
FIG. 7 shows cross-sectional views that schematically illustrate the case when the flakes are vertically aligned in Working Example 1.

Next, while the 2V, 60 Hz AC voltage was still applied, a 2V DC voltage was also applied, with the positive terminal of the power source connected to the substrate 20 (which was positioned at the top of the cell). As shown in the reflection photomicrograph in FIG. 6(b), this caused all of the flakes to make contact with the upper substrate 20 while remaining vertically aligned (voltage applying step). FIG. 7 schematically illustrates this state. As shown in FIG. 7, a part of each of almost all of the flakes is in contact with the substrate 20. In this state, the display panel was irradiated with UV light of intensity 10 mW/cm² for a duration of 600 seconds to polymerize (cure) the resin in the medium, thereby fixing the parts of the flakes in contact with the substrate thereto (illumination step). One plausible reason why the resin dissolved in the medium gathers near the inner surface of the substrate such that the flakes can be fixed thereto is because the molecular weight of the resin increases during the UV curing process, thereby reducing the solubility of the resin in the medium.

As shown in FIGS. 8(a) and 8(b), the flakes in the cell thus formed were aligned horizontally by applying an 8V DC voltage, with the positive terminal of the power source connected to the substrate 20. Next, the flakes were aligned vertically by applying an 8V, 60 Hz AC voltage. Moreover, the flakes were successfully switched between these states several times.

Working Example 2

In Working Example 2, the same mixture used in Working Example 1 was used. The mixture was left to sit under a fluorescent light for approximately 10 hours with an 1.5V, 60 Hz AC voltage applied to the mixture. Next, the mixture was left to sit for approximately 30 minutes with both a 3V, 60 Hz AC voltage as well as a 3V DC voltage set up with the positive terminal of the power source connected to the substrate 20 (which was positioned at the top of the cell) applied to the mixture. As shown in FIG. 9(b), this process fixed the flakes to the substrate 20 in a vertically aligned state. The mechanism by which this occurs is unclear; however, the following explanation offers one possibility. Leaving the mixture under a fluorescent light cures the monomers in the resin to some extent, resulting in the formation of oligomers or low-molecular weight polymers. Next, as shown in FIG. 9(a), applying the biased DC voltage causes the negatively charged oligomers or polymers dispersed in the medium to gather in higher concentration near the substrate 20, and the mixture near the substrate 20 proceeds to harden.

As shown in FIGS. 10(a) and 10(b), the flakes in the cell thus formed were aligned horizontally by applying a 3V DC voltage with the positive terminal of the power source connected to the substrate 20. Next, the flakes were aligned vertically by applying a 3V, 60 Hz AC voltage. Moreover, the flakes were successfully switched between these states several times. The vertical alignment state was also achieved by applying a 3V DC voltage with the negative terminal of the power source connected to the substrate 20.

Working Example 3

A method for manufacturing the display panel 2 according to Working Example 3 will be described below.

First, as an injection step, aluminum flakes with an average particle diameter of 7 μm and a thickness of 0.1 μm, Compound 1, and Compound 2 were mixed in a medium such as propylene carbonate (PC) such that the mixture was 1 wt % aluminum flakes, 0.05 wt % Compound 1 relative to the propylene carbonate, and 0.005 wt % Compound 2 relative to the propylene carbonate.

This mixture was then injected into a cell having a cell gap of 110 μm. In the present working example, IRGACURE 651 (registered trademark, Nagase & Co., Ltd.) was used for Compound 2.

Next, a 1.5V, 60 Hz AC voltage was applied to the cell in which the above mixture was injected to orient the flakes vertically in a state in which the position of the flakes was not regulated in the cell thickness direction (applying voltage step). Furthermore, while the 1.5V, 60 Hz AC voltage was still applied to the cell, a 2V DC voltage was also applied, with the positive terminal of the power source connected to the substrate 20 (which was positioned at the top of the cell) in order to make all of the still vertically aligned flakes make contact with the upper substrate 20. As in Working Example 1, after this voltage application step, a point or side of each of almost all of the flakes was in contact with the substrate 20.

In this state, the display panel was irradiated with UV light of intensity 10 mW/cm$^2$ for a duration of 600 seconds using a metal halide light source in order to cure the resin in the medium, thereby fixing the points or sides of the flakes in contact with the substrate 20 thereto (illumination step). The reason that the resin dissolved in the medium gathers near the inner surface of the substrate such that the flakes can be fixed thereto is likely because the molecular weight of the resin increases during the UV curing process, thereby reducing the solubility of the resin in the medium.

As shown in the transmission photomicrographs in FIGS. 11(a) and 11(b), the flakes in the cell thus formed were aligned horizontally by applying a 4V DC voltage with the positive terminal of the power source connected to the substrate 20. Next, the flakes were aligned vertically by applying a 1.5V, 60 Hz AC voltage. Moreover, the flakes were successfully switched between these states several times. The vertical alignment state was also achieved by applying a 4V DC voltage with the negative terminal of the power source connected to the substrate 20.

As described above, the driving voltages used on the cell constructed in Working Example 1 included an 8V DC voltage and an 8V, 60 Hz AC voltage. Moreover, the driving voltages used on the cell constructed in Working Example 2 included a 3V DC voltage and a 3V, 60 Hz AC voltage.

In contrast, the driving voltages used on the cell constructed in Working Example 3 included a 4V DC voltage and a 1.5V, 60 Hz AC voltage. Note that the AC voltage used as one of the driving voltages in Working Example 3 was lower in magnitude than the cell driving voltages used in Working Examples 1 and 2. As a result, the power consumption of a display device that utilizes cells of the type <Compound 1>

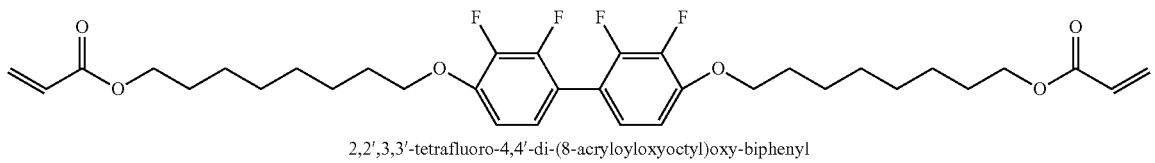

2,2',3,3'-tetrafluoro-4,4'-di-(8-acryloyloxyoctyl)oxy-biphenyl

<Compound 2>

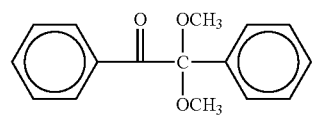

2,2-dimethoxy-1,2-diphenylethane-1-one constructed in Working Example 3 can be reduced in comparison with the power consumption of a display device that utilizes cells of the type constructed in Working Examples 1 or 2.

One plausible reason why the cell in Working Example 3 can be operated at a lower voltage than the cells in Examples 1 and 2 is because Compound 1 used in Working Example 3 contains a number of alkyl chains. As a result, the resin retains a certain degree of flexibility after the curing process. Therefore, the supporting members in the cell in Working Example 3 are more flexible than the supporting members in the cells in Working Examples 1 and 2.

Working Example 4

In the present example, Compound 3 was used to construct a display panel that can be driven at an even lower voltage than the display panel in Working Example 3.
Polyethylene glycol #600 diacrylate

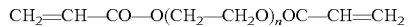

n=14  <Compound 3>

In the present example, A-600 (Shin-Nakamura Chemical Co., Ltd.) was used for Compound 3.

In comparison with Compound 1 used to construct the display panel 2 in Working Example 3, Compound 3 has a higher polarity, better solubility in propylene carbonate, and retains more of the propylene carbonate when it hardens when irradiated with UV light. These characteristics result in improved flexibility of the supporting members and therefore make it possible to construct a display panel that can be driven at an even lower voltage.

Moreover, Compound 4 (a monomer) was used to facilitate fixing the flakes using Compound 3.

<Compound 4>

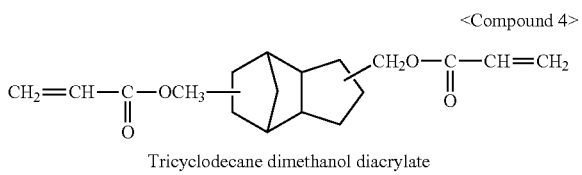

Tricyclodecane dimethanol diacrylate

In the present example, A-DCP (Shin-Nakamura Chemical Co., Ltd.) was used for Compound 4.

Using Compound 4 facilitates gathering the resin on the inner surface of the substrate. Moreover, Compound 4 can be easily separated from the solvent after the polymerization (curing) reaction.

A method for manufacturing the display panel 2 according to Working Example 4 will be described below.

First, aluminum flakes with an average particle diameter of 7 μm and a thickness of 0.1 μm, Compound 3, and Compound 4 were mixed in a medium such as propylene carbonate such that the mixture was 1 wt % aluminum flakes, 0.04 wt % Compound 3 relative to the propylene carbonate, and 0.01 wt % Compound 4 relative to the propylene carbonate. This mixture was then injected into a cell having a cell gap of 110 μm.

Also, 10 wt % of Compound 2 relative to the total mass of the monomer was mixed into the mixture as an initiator.

Next, a 2V, 60 Hz AC voltage was applied to orient the flakes vertically in a state in which the position of the flakes was not regulated in the cell thickness direction. Furthermore, while the 2V, 60 Hz AC voltage was still applied to the cell, a 1V DC voltage was also applied, with the positive terminal of the power source connected to the substrate 10 (which was positioned at the bottom of the cell) in order to make all of the still vertically aligned flakes make contact with the lower substrate 10.

Figure 12:
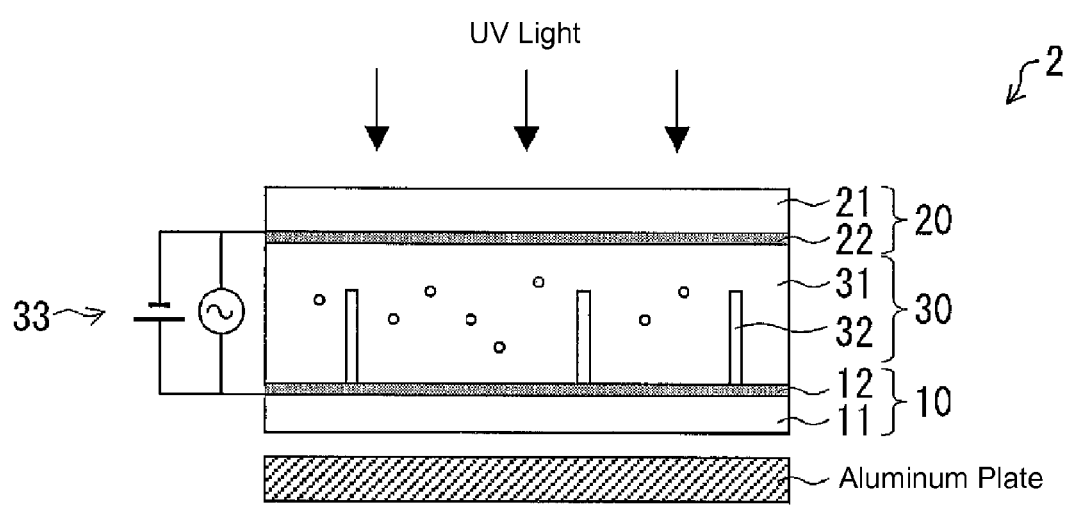
FIG. 12 is a cross-sectional view illustrating an irradiation process used in Working Example 4.

In this state, the display panel was irradiated with UV light of intensity 10 mW/cm$^2$ for a duration of 1800 seconds using a metal halide light source. Also, as shown in FIG. 12, an aluminum plate or the like can be placed below the substrate 10 and the display panel can be irradiated with UV light from the side on which the substrate 20 is disposed. This makes the UV light reflect off the surface of the aluminum plate and more efficiently irradiate the display panel with UV light.

As shown in the transmission photomicrographs in FIGS. 13(a) and 13(b), the flakes in the cell thus formed were aligned horizontally by applying a 3V DC voltage with the positive terminal of the power source connected to the substrate 10. Next, the flakes were aligned vertically by applying a 1.5V, 60 Hz AC voltage. Moreover, the flakes were successfully switched between these states several times.

Working Example 5

In the present example, Compound 3 was used like in Working Example 4.

Moreover, Compound 5 (a monomer) was used to facilitate fixing the flakes using Compound 3.

<Compound 5>

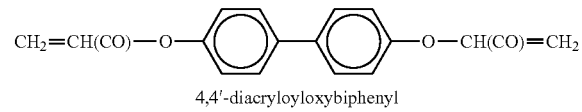

4,4'-diacryloyloxybiphenyl

A method for manufacturing the display panel 2 according to Working Example 5 will be described below.

First, aluminum flakes with an average particle diameter of 7 μm and a thickness of 0.1 μm, Compound 3, and Compound 5 were mixed in a medium such as propylene carbonate such that the mixture was 1 wt % aluminum flakes, 0.04 wt % Compound 3 relative to the propylene carbonate, and 0.01 wt % Compound 5 relative to the propylene carbonate. This mixture was then injected into a cell having a cell gap of 110 μm.

Also, 10 wt % of Compound 2 relative to the total mass of the monomer was mixed into the mixture as an initiator.

Next, the same voltage application and irradiation steps used in Working Example 4 were performed.

The flakes in the cell thus formed were aligned horizontally by applying a 3V DC voltage with the positive terminal of the power source connected to the substrate 10. Next, the flakes were aligned vertically by applying a 1.5V, 60 Hz AC voltage. Moreover, the flakes were successfully switched between these states several times.

Comparison Example 1

A method for manufacturing the display panel 2 according to Comparison Example 1 will be described below.

First, aluminum flakes with an average particle diameter of 7 μm and a thickness of 0.1 μm as well as Compound 3 were mixed in a medium such as propylene carbonate such that the mixture was 1 wt % aluminum flakes and 0.05 wt %

Compound 3 relative to the propylene carbonate. This mixture was then injected into a cell having a cell gap of 120 μm.

Also, 10 wt % of Compound 2 relative to the total mass of the monomer was mixed into the mixture as an initiator.

Next, while a 1.5V, 60 Hz AC voltage was applied to the cell, a 0.5V DC voltage was also applied, with the positive terminal of the power source connected to the substrate 10 (which was positioned at the bottom of the cell).

In this state, the display panel was irradiated with UV light of intensity 10 mW/cm$^2$ for a duration of 600 seconds using a metal halide light source.

However, unlike in Working Examples 1 to 5, the flakes were not successfully fixed to one of the substrates in a state in which all of the flakes were vertically aligned. Moreover, even when the duration of irradiation with UV light was increased to 1800 seconds, the flakes were still not successfully fixed to one of the substrates in a state in which all of the flakes were vertically aligned.

Furthermore, even when the concentration of Compound 3 was increased to 1 wt % relative to the propylene carbonate, the flakes were still not successfully fixed to one of the substrates.

One plausible reason why the flakes could not be fixed to one of the substrates in the method for manufacturing the display panel 2 according to Comparison Example 1 is because the solubility of Compound 3 in propylene carbonate remains high even after Compound 3 is cured by irradiating the compound with UV light, and therefore the resin did not gather near the inner surface of the substrate.

Compound 3 contains a diacrylate and should therefore fix the flakes due to the reaction of the diacrylate to UV light. However, Compound 3 has a molecular structure in which ethylene oxide is more prone to polymerization, and therefore the solubility of Compound 3 in propylene carbonate does not decrease after the reaction to UV light because the resin retains a certain degree of flexibility and polarity.

Comparison Example 2

A method for manufacturing the display panel 2 according to Comparison Example 2 will be described below.

First, aluminum flakes with an average particle diameter of 7 μm and a thickness of 0.1 μm, Compound 3, and Compound 1 were mixed in a medium such as propylene carbonate such that the mixture was 1 wt % aluminum flakes, 0.04 wt % Compound 3 relative to the propylene carbonate, and 0.01 wt % Compound 1 relative to the propylene carbonate. This mixture was then injected into a cell having a cell gap of 110 μm.

Also, 10 wt % of Compound 2 relative to the total mass of the monomer was mixed into the mixture as an initiator.

Next, while a 4V, 60 Hz AC voltage was applied to the cell, a 1V DC voltage was also applied, with the positive terminal of the power source connected to the substrate 10 (which was positioned at the bottom of the cell).

In this state, the display panel was irradiated with UV light of intensity 10 mW/cm$^2$ for a duration of 1800 seconds using a metal halide light source.

However, unlike in Working Examples 1 to 5, the flakes were not successfully fixed to one of the substrates in a state in which all of the flakes were vertically aligned.

Summary of Working Examples and Comparison Examples

FIG. 14 shows the correspondence between the monomers used and the display panels manufactured in Working Examples 3 to 5 and Comparison Examples 1 and 2.

As shown in FIG. 14, the flakes could not be successfully fixed to the substrate using the method for manufacturing a display panel used in Comparison Examples 1 and 2.

In contrast, the display panel in Working Example 3 was successfully driven using a 4V DC voltage and a 1.5V, 60 Hz AC voltage.

Furthermore, the display panels in Working Examples 4 and 5 were successfully driven using a 3V DC voltage and a 1.5V, 60 Hz AC voltage.

In Working Examples 3 to 5, the flakes could be switched between alignment states using low driving voltages primarily because a monomer that was highly soluble in the medium was used to form a highly flexible film fixing the flakes to the substrate. Using a resin to fix the flakes to the substrate solves the problem of non-uniform in-plane flake behavior present in conventional technologies and can reduce the occurrence of other problems with these conventional technologies such as display irregularities and regions in which nothing is displayed.

Embodiment 2

A display device according to Embodiment 2 of the present invention will be described below with reference to figures.

Note that the description below focuses primarily on the aspects of the display device according to the present embodiment that are different from the display device according to Embodiment 1. The same reference characters are used to indicate the components that have the same functions as the components introduced in Embodiment 1, and the description of those components will be omitted here.

FIGS. 15(a) and 15(b) are cross-sectional views schematically illustrating a configuration of a display device 1a according to Embodiment 2. The display device 1a includes a display panel 2a, a backlight 3 that illuminates the display panel 2a, and drive circuits (not shown in the figure). The display device 1a is a transmissive display device in which light from the backlight 3 passes through the display panel 2a to display an image.

The display panel 2a includes a pair of substrates 10a and 20a disposed oppositely to one another as well as a light modulating layer 30a provided in between the pair of substrates 10a and 20a. The first substrate 10a is provided on the rear side (near the backlight 3) of the display device, and the second substrate 20a is provided on the display surface side (viewer side) of the display device. Moreover, the display panel 2a includes a large number of pixels arranged in a matrix pattern.

The substrates 10a and 20a each include an insulating substrate such as a transparent glass substrate, for example. The substrates 10a and 20a also include electrodes 12 and 22, respectively.

A hydrophobic treatment is applied to at least the side of the substrate 10a that is in contact with the light modulating layer 30a, and a hydrophilic treatment is applied to at least the side of the substrate 20a that is in contact with the light modulating layer 30a. Applying a hydrophobic treatment to the substrate 10a ensures that when both a polar solvent and a non-polar solvent are injected into the light modulating layer 30a, the non-polar solvent will stay in contact with the substrate 10a. Examples of specific hydrophobic treatments that can be used include a spin coating process using a fluororesin such as Teflon AF (registered trademark, DuPont Co.) or CYTOP (Asahi Glass Co., Ltd.) and a chemical vapor deposition (CVD) process in which a parylene film is formed.

Applying a hydrophilic treatment to the substrate 20a ensures that when both a polar solvent and a non-polar solvent are injected into the light modulating layer 30a, the polar solvent will stay in contact with the substrate 20a. Examples of specific hydrophilic treatments that can be used include, for example: a vacuum deposition process in which an inorganic oxide film or the like is formed using a material such as silicon oxide, titanium oxide, aluminum oxide, or zinc oxide; processes in which a film is formed such as a sputtering process, a CVD process, a physical vapor deposition (PVD) process, a sol-gel process, or a coating process; and a surface treatment process in which a silane coupling agent that has a polar group, or the like, is used.

Alternatively, the hydrophobic treatment may be applied to the substrate 20a and the hydrophilic treatment may be applied to the substrate 10a.

As described above, the display device 1a according to Embodiment 2 includes a pair of substrates in which one of the substrates is hydrophilic and stays in contact with a polar solvent and the other substrate is hydrophobic and stays in contact with a non-polar solvent.

Moreover, conductive electrode films made from ITO or a vapor-deposited aluminum layer or the like may be formed on the entire inner surfaces of the substrates 10a and 20a that sandwich the light modulating layer 30a. The electrodes may be patterned to enable segmented display or passive display. An active matrix substrate made using TFTs or the like may be provided using at least one of the substrates. In the following description, the substrate 10a is used as the active matrix substrate as an example.

More specifically, the substrate 10a includes a glass substrate 11 on which signal lines (scan signal lines, data signal lines, and the like) (not shown in the figure), thin film transistors (TFTs) (not shown in the figure), an insulating film (not shown in the figure), and the electrodes 12 (pixel electrodes) are provided in order. Conventional drive circuits are used for the drive circuits for driving the signal lines (the scan signal line driver circuit, the data signal line drive circuit, and the like).

The substrate 20a includes a glass substrate 21, on which the electrode 22 (common electrode) is provided. The electrode 12 of the substrate 10a and the electrode 22 of the substrate 20a are formed using a transparent conductive film made from a material such as indium tin oxide (ITO), indium zinc oxide (IZO), zinc oxide, or tin oxide. Moreover, the electrode 12 is formed for each pixel, and the electrode 22 is formed in a solid shape to make electrode 22 the common electrode for all of the pixels. It should also be noted that the electrode 22 may be formed for each pixel like the electrode 12.

The light modulating layer 30a is provided between the electrodes 12 and 22 and includes a medium that contains a polar solvent 31a and a non-polar solvent 31b, a plurality of shape-anisotropic members 32a contained in the medium, and supporting members 34. A voltage is applied to the light modulating layer 30a using a power source 33 connected to the electrodes 12 and 22, and the transmittance of light from the backlight 3 that enters the light modulating layer 30a is controlled by changing the magnitude or frequency of the applied voltage. The thickness of the light modulating layer 30a (cell thickness) is determined according to the length of the long axes of the shape-anisotropic members 32a and is set to 80 μm, for example.

The supporting members 34 are formed on the electrode 22 of the substrate 20a using a resin.

The shape-anisotropic members 32a are shape-anisotropic, responsive members that rotate or deform according to the direction of the electric field applied. Moreover, one end of each of the shape-anisotropic members 32a is connected to one of the supporting members 34 such that the shape-anisotropic members 32a can rotate (or deform) around the supporting members 34 (which serve as fulcrums). The shape and other characteristics of the shape-anisotropic members 32a are the same as in Embodiment 1.

Moreover, a hydrophilic treatment or a hydrophobic treatment is applied to the surfaces of the shape-anisotropic members 32a. Any well-known method can be used to perform the surface treatment process. A sol-gel process in which the shape-anisotropic members are coated in silicon dioxide can be used for the hydrophilic treatment, for example. A dip-coating process in which the shape-anisotropic members are coated in one of the abovementioned fluororesins can be used for the hydrophobic treatment, for example. Alternatively, the surface treatment for the shape-anisotropic members 32a may be skipped and the shape-anisotropic members 32a themselves formed using hydrophilic members or hydrophobic members. A material such as aluminum oxide can be used to form hydrophilic members, for example. A material such as polyethylene terephthalate (PET) can be used to form hydrophobic members, for example. In this way, the shape-anisotropic members 32a are either hydrophilic or hydrophobic. FIG. 15 depicts a case in which the shape-anisotropic members 32a are hydrophilic.

The medium includes a polar solvent 31a that stays in contact with the hydrophilic substrate 20a and a non-polar solvent 31b that stays in contact with the hydrophobic substrate 10a. The polar solvent 31a and the non-polar solvent 31b are both materials that transmit light in the visible spectrum. Liquids that exhibit essentially no absorption of light in the visible spectrum, mixtures in which such liquids are colored using a pigment, or the like can be used for the polar solvent 31a and the non-polar solvent 31b. Moreover, it is preferable that the specific gravities of the polar solvent 31a and the non-polar solvent 31b be equal, or that the specific gravities of the polar solvent 31a and the non-polar solvent 31b be equal and also be close or equal to the specific gravity of the shape-anisotropic members 32a.

Moreover, it is preferable that the polar solvent 31a and the non-polar solvent 31b have low volatility in consideration of the process that will be used to seal the medium containing those solvents inside a cell (the light modulating layer 30a). In addition, the viscosities of the polar solvent 31a and the non-polar solvent 31b should promote the responsiveness of the display device. It is preferable that the viscosities of the polar solvent 31a and the non-polar solvent 31b be 5 mPa·s or less.

Moreover, the polar solvent 31a and the non-polar solvent 31b may both be a single substance or may both be mixtures created using a plurality of substances. Examples of substances that can be used for the polar solvent 31a include organic solvents such as water, alcohol, acetone, formamide, ethylene glycol; ionic liquids; and mixtures of those substances. Examples of substances that can be used for the non-polar solvent 31b include silicone oils, aliphatic hydrocarbons, or the like.

As described above, the display panel 2a includes a power source 33, hydrophilic shape-anisotropic members 32a, the polar solvent 31a that stays in contact with the hydrophilic substrate, the non-polar solvent 31b that stays in contact with the hydrophobic substrate, and the supporting members 34. This configuration makes the shape-anisotropic members 32a rotate around the supporting members 34 (which serve as fulcrums) and stay contained in the polar solvent 31a when no voltage is applied to the light modulating layer 30a.

Here, it is preferable that the thickness of the layer of the polar solvent 31a be different than the thickness of the layer of the polar solvent 31b.

When the shape-anisotropic members 32a are hydrophilic as shown in FIG. 15(a), for example, the thickness of the layer of the polar solvent 31a should be smaller than the thickness of the layer of the non-polar solvent 31b. In this case, it is preferable that the thickness of the layer of the polar solvent 31a be 1 μm or smaller and that the thickness of the layer of the polar solvent 31a be set equal to the thickness of the shape-anisotropic members 32a or a multiple of the thickness of the shape-anisotropic members 32a. The shape-anisotropic members 32a rotate around the supporting members 34 (which serve as fulcrums) and take a stable alignment at a position within the narrow layer of the polar solvent 31a. When flakes are used for the shape-anisotropic members 32a, the flakes rotate around the supporting members 34 (which serve as fulcrums) and orient clinging to the hydrophilic substrate (in FIG. 15, substrate 20a). This state is also called "horizontal alignment" below.

When the shape-anisotropic members 32a are hydrophobic, the thickness of the layer of the non-polar solvent 31b should be smaller than the thickness of the layer of the polar solvent 31a. In this case, the supporting members 34 are provided on the hydrophobic substrate (in FIG. 15, substrate 10a). In this case, it is preferable that the thickness of the layer of the non-polar solvent 31b be 1 μm or smaller and that the thickness of the layer of the non-polar solvent 31b be set equal to the thickness of the shape-anisotropic members 32a or a multiple of the thickness of the shape-anisotropic members 32a. The shape-anisotropic members 32a rotate around the supporting members 34 (which serve as fulcrums) and take a stable alignment at a position within the narrow layer of the non-polar solvent 31b. When flakes are used for the shape-anisotropic members 32a, the flakes rotate around the supporting members 34 (which serve as fulcrums) and orient clinging to the hydrophobic substrate. This state is also called "horizontal alignment" below.

Next, a method for controlling the transmittance of light using the light modulating layer 30a will be described in detail. In the following description, hydrophilic flakes are used for the shape-anisotropic members 32a.

As shown in FIG. 16(a), when no AC or DC voltage is applied to the light modulating layer 30a, the flakes stay contained in the polar solvent 31a. In other words, because part of each of the flakes is rotatably connected to one of the supporting members 34, the flakes rotate around the supporting members and (horizontally) orient, clinging to the hydrophilic substrate 20a and stabilizing at a position within the polar solvent 31a. In this state, light from the backlight 3 that would have entered the light modulating layer 30a is blocked by the flakes and therefore does not pass through the light modulating layer 30a.

As shown in FIG. 16(b), when an AC or DC voltage is applied to the light modulating layer 30a, the flakes rotate around the supporting members 34 (which serve as fulcrums) such that the long axes of the flakes become parallel to the lines of electric force. This rotation occurs due to dielectrophoresis and forces governed by Coulomb's law or other laws of electrical energy. In other words, the flakes orient such that the long axes thereof are perpendicular to the substrates 10a and 20a. This state is also called "vertical alignment" below. In this state, light from the backlight 3 that enters the light modulating layer 30a passes therethrough and exits on the viewer side of the display device.

Starting from the state shown in FIG. 16(b), when the voltage applied to the light modulating layer 30a is switched off, the flakes begin to rotate around the supporting members 34 (which serve as fulcrums) due to interfacial tension between the flakes and the non-polar solvent 31b, as shown in FIG. 16(c). As shown in FIG. 16(a) the flakes then proceed to orient (horizontally) such that the long axes thereof are parallel to the substrates 10a and 20a. In this state, light from the backlight 3 that would have entered the light modulating layer 30a is blocked by the flakes and therefore will no longer pass through the light modulating layer 30a.

Here, the alignment state taken by the flakes (whether that state be vertical alignment, horizontal alignment, an alignment in between those two states, an orientation with a prescribed tilt from the horizontal alignment plane, or the like) is determined by the balance between the torque forces that cause rotation and the length of the flakes L (see FIG. 16(c)) that is submerged in the non-polar solvent 31b. If the thickness of the layer of the polar solvent 31a is sufficiently larger than the thickness of the flakes, for example, the orientation of the flakes cannot be completely controlled during the period of time from when the flakes start in the state in which no voltage is applied until the flakes begin to enter the non-polar solvent 31b unless external forces such as gravity are utilized. On the other hand, setting the thickness of the layer of the polar solvent 31a to be (i) equal to or less than (thinner) than the thickness of the flakes, or (ii) equal to or less than (thinner) than a multiple of the thickness of the flakes if more flakes than are needed to cover the display surface (substrate surface) in the horizontal alignment state are used, the so-called "play" in the flakes can be reduced or eliminated entirely, and therefore the orientation of the flakes can be controlled.

Meanwhile, setting the thickness of the layer of the polar solvent 31a to be sufficiently larger (thicker) than the thickness of the flakes also has an advantage: doing so causes the normal direction from the surface of the flakes to have a slight tilt, on average, with respect to the lines of electric force, and therefore applying a voltage more reliably creates the torque needed to rotate the flakes.

Moreover, if an ionic silane coupling agent or the like is applied to the flakes and the flakes are charged positively or negatively within the medium, for example, both an interfacial tension force that moves the flakes towards the horizontal alignment state as well as an electrophoretic force can be created by applying a DC voltage, and therefore the response time of the display device can be further improved.

The transmittance of light from the backlight 3 that enters the light modulating layer 30a can therefore be changed by switching the voltage applied to the light modulating layer 30a on and off to make the flakes rotate around the supporting members 34 (which serve as fulcrums) and switch between the vertical and horizontal alignment states.

Moreover, particularly if a conductor such as a metal is used for the flakes, there is a danger that applying a voltage could make the flakes clump together and form a bridge between the electrodes. However, using the configuration of the present embodiment as described above can reduce the occurrence of clumping that could lead to bridge formation because this configuration can prevent both (i) exacerbating dispersion of the flakes in the non-polar solvent when hydrophilic flakes are used, and (ii) exacerbating dispersion of the flakes in the polar solvent when hydrophobic flakes are used.

When flakes are used for the shape-anisotropic members 32a, it is preferable that the thickness of the flakes be 1 μm or less, and it is more preferable that the thickness of the flakes be 0.1 μm or less. The thinner the flakes are, the more the transmittance of the display device can be increased.

Moreover, as in Embodiment 1, because part of each flake (each shape-anisotropic member 32a) is rotatably connected to one of the supporting members 34, the flakes do not exhibit non-uniform in-plane behavior of the type found in conventional technologies (see FIG. 24). As a result, the present embodiment can reduce the occurrence of problems of the type found in conventional display technologies, such as display irregularities and regions in which nothing is displayed.

As a modification example of the display device 1a, a hydrophilic treatment may be applied to the glass substrate 11 and a hydrophobic treatment may be applied to the glass substrate 21 such that the polar solvent 31a maintains contact with the substrate 10a and the non-polar solvent 31b maintains contact with the substrate 20a. Also, the supporting members 34 may be provided on the substrate 10a. In this case, a hydrophilic treatment is applied to the flakes (shape-anisotropic members 32a). In this configuration, the flakes orient vertically extending out from the substrate 10a when a voltage is applied, and the flakes rotate around the supporting members 34 (which serve as fulcrums) to take a stable horizontal alignment clinging to the substrate 10a when the applied voltage is switched off.

As another modification example of the display device 1a, in the modification example above a hydrophobic treatment may be applied to the flakes (shape-anisotropic members 32a) and the supporting members 34 may be provided on the substrate 20a. As shown in FIG. 15, in this configuration the flakes orient vertically extending out from the substrate 20a when a voltage is applied, and the flakes rotate around the supporting members 34 (which serve as fulcrums) to take a stable horizontal alignment clinging to the substrate 20a when the applied voltage is switched off. It should be noted that in this case, the thickness of the layer of the non-polar solvent 31b should be smaller than the thickness of the layer of the polar solvent 31a.

Embodiment 3

A display device according to Embodiment 3 of the present invention will be described below with reference to figures.

Note that the description below focuses primarily on the aspects of the display device according to the present embodiment that are different from the display device according to Embodiment 1. The same reference characters are used to indicate the components that have the same functions as the components introduced in Embodiment 1, and the description of those components will be omitted here.

FIGS. 17(a) and 17(b) are cross-sectional views schematically illustrating a configuration of a display device 1b according to Embodiment 3. FIG. 17(a) shows the light transmitting state, and FIG. 17(b) shows the light reflecting state.

As shown in FIGS. 17(a) and 17(b), the display device 1b includes a display panel 2b, a backlight 3 that illuminates the display panel 2b, and drive circuits (not shown in the figure). The display device 1b is a transmissive display device in which light from the backlight 3 passes through the display panel 2b to display an image.

The display panel 2b includes pair of substrates 10b and 20b disposed oppositely to one another, a light modulating layer 30b provided in between the pair of substrates 10b and 20b, relay circuits 41 and 51 (switch circuits) that switch the direction of the electric field applied to the light modulating layer 30b by selecting the electrodes to which to apply a voltage, and a power source 61.

Moreover, the display panel 2b includes a large number of pixels arranged in a matrix pattern.

The substrate 10b is an active matrix substrate. The substrate 10b includes an insulating substrate 11 on which signal lines (scan signal lines, data signal lines, and the like) (not shown in the figure), switching elements such as thin film transistors (TFTs) (not shown in the figure), an insulating film (not shown in the figure), a lower electrode layer formed by a solid electrode 12, an insulating layer 13, and an upper electrode layer formed by comb-shaped electrodes 14 and 15 (see FIG. 18) are layered in order.

The solid electrode 12 is formed on the insulating substrate 11 in a solid shape that spans essentially the entire area projected onto the insulating substrate 11 by the opposite substrate 20b such that the solid electrode 12 covers the entire display region of the substrate 10b (the region enclosed by a sealing agent).

Moreover, the insulating layer 13 is formed in a solid shape that covers the entire display region of the substrate 10b and thereby also covers the solid electrode 12.

Figure 18:
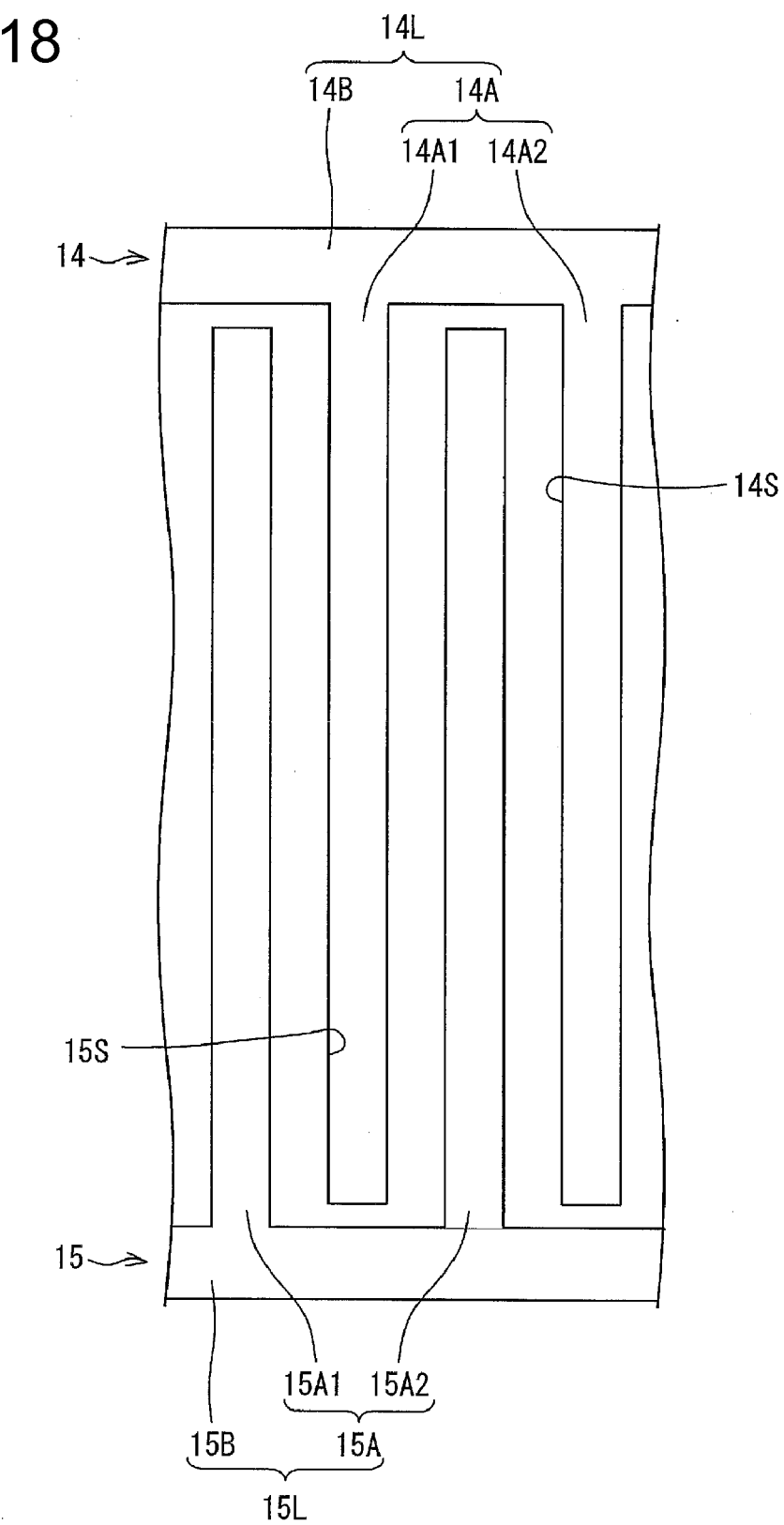
FIG. 18 is a plan view schematically illustrating a configuration of comb-shaped electrodes in the display device shown in FIG. 17.
Figure 23:
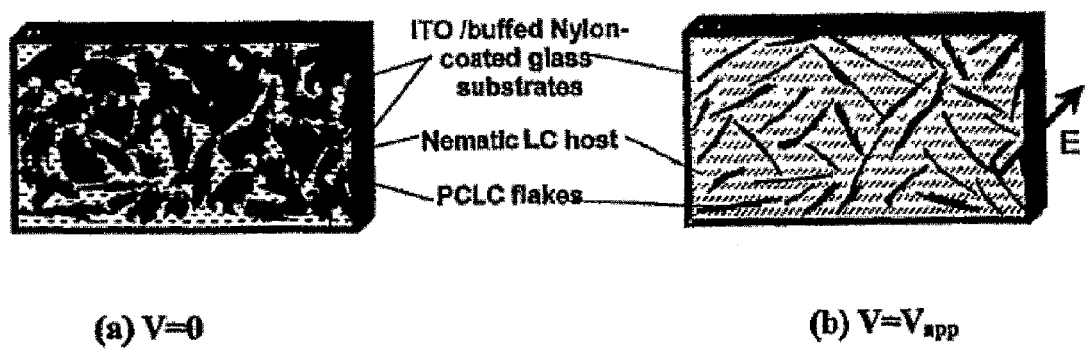
FIGS. 23(a) and 23(b) are cross-sectional views schematically illustrating a configuration of a conventional optical device.

FIG. 18 is a plan view of the substrate 10b that schematically illustrates a configuration of the comb-shaped electrodes 14 and 15.

As shown in FIG. 18, the comb-shaped electrode 14 includes a patterned electrode portion 14L (electrode lines) and a space portion 14S (where no part of the electrode is present). More specifically, the electrode 14 includes a main electrode 14B (main line) and sub-electrodes 14A (branch lines) that extend from the main electrode 14B and form the comb teeth of the comb-shaped electrode 14.

Similarly, the comb-shaped electrode 15 includes a patterned electrode portion 15L (electrode lines) and a space portion 15S (where no part of the electrode is present). More specifically, the electrode 15 includes a main electrode 15B (main line) and sub-electrodes 15A (branch lines) that extend from the main electrode 15B and form the "teeth" of the comb-shaped electrode 15.

In FIGS. 17(a) and 17(b), the cross-sections shown for the comb-shaped electrodes 14 and 15 are the cross-sections of the sub-electrodes 14A and 15A.

The number of teeth (sub-electrodes 14A and 15A) of the comb-shaped electrodes 14 and 15 (m, n) provided in a single pixel is not particularly limited and can be determined on the basis of pixel pitch, the relationship L/S for each of the comb-shaped electrodes 14 and 15 (that is, the ratio of the line (sub-electrode) width to the width of the space (where no part of the electrode is present)), or the like. Here, L is the width of the sub-electrodes 14A and 15A of the electrode portions 14L and 15L, and S is the width of the space portions 14S and 15S.

However, the width of the space portions 14S and 15S must be larger than the width of the sub-electrodes 14A and 15A. As shown in FIGS. 17(a) and 17(b) and FIG. 18, the sub-electrodes 14A (14A1, 14A2, ..., 14Am, where m is an integer greater than or equal to 1) and 15A (15A1, 15A2, ..., 15An, where n is an integer greater than or equal to 1) are arranged in an alternating pattern such that the comb-shaped electrodes 14 and 15 are "geared" together.

As a result, the number of sub-electrodes 14A and 15A is substantially determined by the pixel pitch, the relationship L/S for each of the comb-shaped electrodes 14 and 15 (that is, the ratio of the widths of each of the sub-electrodes 14A and 15A to the widths of the respective spaces 14S and 15S between adjacent sub-electrodes 14A and 15A), or the like.

The sub-electrodes 14A and 15A may each be formed in a straight line shape, a V shape, or a zigzag shape.

One of the comb-shaped electrodes 14 and 15 (here, the comb-shaped electrode 14) is the common electrode and is electrically connected to common lines formed around the display region.

Moreover, the other comb-shaped electrode (here, the comb-shaped electrode 15) is the pixel electrode and is connected to the following components (which are not shown in the figure): a drain electrode, signal lines (scan signal lines, data signal lines), and switching elements such as TFTs. The comb-shaped electrode 15 applies signals according to the image signals sent.

The substrate 20b is the opposite substrate and includes an insulating substrate 21 on which a solid electrode 22 is provided.

The solid electrode 22 is formed on the insulating substrate 21 in a solid shape that spans essentially the entire area projected onto the insulating substrate 21 by the opposite substrate 10b such that the solid electrode 22 covers the entire display region of the substrate 20b (the region enclosed by a sealing agent).

Next, examples of materials that can be used for each layer of the substrates 10b and 20b as well as examples of processes for forming those layers will be described.

As described above, the display device 1b is a transmissive display device. The substrates 10b and 20b include a transparent substrate such as a glass substrate for the insulating substrates 11 and 21, for example.

Moreover, each of the electrodes in the substrates 10b and 20b (that is, the solid electrodes 12 and 22 as well as the comb-shaped electrodes 14 and 15) are formed using a transparent conductive film made from a material such as indium tin oxide (ITO), indium zinc oxide (IZO), zinc oxide, or tin oxide, for example.

The process used to form (layer) these electrodes is not particularly limited, and any well-known method such as sputtering, vacuum deposition, or plasma CVD can be used. Moreover, the process used to pattern the comb-shaped electrodes 14 and 15 is not particularly limited, and a well-known patterning method such as photolithography can be used.

The film thickness of these electrodes is not particularly limited, but it is preferable that the film thickness be set in the range of 100 Å to 2000 Å.

Moreover, the insulating layer 13 may be an inorganic insulating film made from an inorganic insulating material such as silicon nitride or silicon dioxide, for example. The insulating layer 13 may also be an organic insulating film made from an organic insulating material (a resin material) such as an acrylic resin, for example.

The film thickness of the insulating layer 13 should be smaller than the spacing between the adjacent electrode portions 14L and 15L (that is, the distance (spacing) between adjacent sub-electrodes 14A and 15A in the upper electrode layer formed by the comb-shaped electrodes 14 and 15).

The film thickness of the insulating layer 13 also depends on the type of film used (such as an inorganic insulating film, an organic insulating film, or the like) but can be set in the range of 1000 Å to 30000 Å, for example.

The film thickness of the insulating layer 13 may be set as appropriate according to the type of film used and is not particularly limited. However, it is preferable that the film thickness of the insulating layer 13 be as small as possible because a thinner insulating layer facilitates movement of the shape-anisotropic members 32b in the light modulating layer 30b, as described below, and because a thinner insulating layer makes it possible to make the display panel 2b thinner overall. However, it is preferable that the film thickness of the insulating layer 13 be at least 1000 Å in order to prevent insulation issues and irregularities in film thickness due to lattice defects.

The process used to form (layer) the insulating layer 13 is not particularly limited, and any conventional, well-known method such as sputtering, vacuum deposition, plasma CVD, or direct application can be used based on parameters such as the insulating material that is used.

The abovementioned layered assembly that includes a solid electrode, insulating layer, and comb-shaped electrodes can be obtained as follows, for example. First, an insulating layer made from a material such as one of the abovementioned resins or inorganic substances is formed on a solid electrode made from a conductive electrode film. On top of this insulating layer, another conductive electrode film is formed, and then patterned and etched using a known photoresist such as a photosensitive resin. Finally, the photoresist is removed to form the comb-shaped electrode.

Moreover, in one example of a cell configuration that could be used when using flakes with a particle diameter of 6 μm, the comb-shaped electrodes 14 and 15 have an electrode width of 3 μm and an electrode spacing of 5 μm, and the cell thickness is set to 50 μm, for example.

It should be noted that the necessary cell configuration is not limited to this example. However, it is preferable that the shape-anisotropic members 32b (such as flakes) have a particle diameter larger than the electrode widths in order to prevent spaces between the flakes when in the horizontal alignment state on the comb-shaped electrode (which has a weak horizontal electric field).

The light modulating layer 30b is provided between the substrates 10b and 20b and includes a medium 31, a plurality of shape-anisotropic members 32b contained in the medium 31, and supporting members 34.

The light modulating layer 30b can be formed by fixing the substrates 10b and 20b to one another using spacers (not shown in the figure) and a sealing agent (not shown in the figure) and then injecting the medium 31 that contains the shape-anisotropic members 32b into the empty space between the substrates 10b and 20b, for example.

The thickness of the light modulating layer 30b (cell thickness) is determined according to the length of the long axes of the shape-anisotropic members 32b and can be set to 80 μm, for example.

The supporting members 34 are formed on the electrode 22 of the substrate 20b using a resin.

The shape-anisotropic members 32b are shape-anisotropic, responsive members that rotate or deform according to the direction of the electric field applied. Moreover, one end of each of the shape-anisotropic members 32b is connected to one of the supporting members 34 such that the shape-anisotropic members 32b can rotate (or deform) around the supporting members 34 (which serve as fulcrums). The shape and other characteristics of the shape-anisotropic members 32b are the same as in Embodiment 1.

The shape and material used for the shape-anisotropic members 32b is not particularly limited as long as the area of the image projected by the shape-anisotropic members 32b when viewed in plan view changes according to the direction of the electric field applied.

Moreover, the thickness of the shape-anisotropic members 32b is not particularly limited; however, the thinner the shape-anisotropic members 32b are, the more the transmittance of the overall display device can be increased. Therefore, it is preferable that the thickness of the shape-anisotropic members 32b be at least smaller than the electrode spacing (the distance between electrodes) of the comb-shaped electrodes 14 and 15 (less than or equal to 4 µm, for example), and it is more preferable that the thickness of the shape-anisotropic members 32 be less than or equal to the wavelength of light (less than or equal to 0.5 µm, for example). When flakes are used for the shape-anisotropic members 32b, for example, it is preferable that the thickness of the flakes be 1 µm or less, and it is more preferable that the thickness of the flakes be 0.1 µm or less.

The medium 31 is the same as in Embodiment 1.

The solid electrode 12 of the substrate 10b is electrically connected to the power source 61 via a relay circuit 41. A wire 42 for applying a voltage to the solid electrode 12 is provided between the solid electrode 12 and the relay circuit 41.

Moreover, the solid electrode 22 of the substrate 20b is electrically connected to the power source 61 via a relay circuit 51. A wire 52 for applying a voltage to the solid electrode 22 is provided between the solid electrode 22 and the relay circuit 51.

Moreover, the comb-shaped electrodes 14 and 15 are electrically connected to the power source 61 via the relay circuits 41 and 51, respectively. A wire 43 for applying a voltage to the comb-shaped electrode 14 is provided between the comb-shaped electrode 14 and the relay circuit 41. Moreover, a wire 53 for applying a voltage to the comb-shaped electrode 15 is provided between the comb-shaped electrode 15 and the relay circuit 51.

Furthermore, a wire 44 that connects the relay circuit 41 to the power source 61 is provided therebetween. Similarly, a wire 54 that connects the relay circuit 51 to the power source 61 is provided therebetween.

In the present embodiment, the relay circuits 41 and 51 can be used to switch to which electrodes (out of the solid electrodes 12 and 22 and the comb-shaped electrodes 14 and 15) a voltage is applied.

In other words, the relay circuits 41 and 51, the power source 61, and each of the wires 42 to 44 and 52 to 54 together function as a circuit for changing the direction of the electric field applied to the light modulating layer 30b. The relay circuits 41 and 51, the power source 61, and each of the wires 42 to 44 and 52 to 54 also function together as a voltage application unit that selectively applies a voltage to each of the solid electrodes 12 and 22 as well as the comb-shaped electrodes 14 and 15. Moreover, the relay circuits 41 and 51 function as switching circuits (selection circuits) for selecting, out of the solid electrodes 12 and 22 and the comb-shaped electrodes 14 and 15 provided on the substrates 10b and 20b, the electrodes to which to apply a voltage.

As shown in FIG. 17(a), for example, switching the relay circuit 41 such that the power source 61 and the solid electrode 12 are connected and also switching the relay circuit 51 such that the power source 61 and the solid electrode 22 are connected applies a vertical electric field that is perpendicular to the substrates 10b and 20b to the light modulating layer 30b.

Meanwhile, as shown in FIG. 17(b), for example, switching the relay circuit 41 such that the power source 61 and the comb-shaped electrode 14 are connected and also switching the relay circuit 51 such that the power source 61 and the comb-shaped electrode 15 are connected applies a horizontal electric field that is parallel to the substrates 10b and 20b to the light modulating layer 30b.

The relay circuits 41 and 51 may be switched on the basis of a switching signal that switches the electrodes to which a voltage is applied and is sent from a signal source (not shown in the figure), for example, or the relay circuits 41 and 51 may be switched manually.

Next, a method for controlling the transmittance of light using the light modulating layer 30b as well as a method for using the display panel 2b to display an image will be described in detail. In the following description, flakes are used for the shape-anisotropic members 32b as an example.

FIG. 19(a) is a cross-sectional view of the principal parts of the display panel 2b showing the paths that light would take in FIG. 17(a), and FIG. 19(b) is a cross-sectional view of the principal parts of the display panel 2b showing the paths that light would take in FIG. 17(b). Note that the relay circuits 41 and 51 and the power source 61 are not shown in FIGS. 19(a) and 19(b). Moreover, FIGS. 17(b) and 19(b) depict an example case in which the flakes are aligned clinging to the substrate 10b.

As described above, in the present embodiment the alignment of the shape-anisotropic members 32b can be reversibly changed by switching back and forth between a vertical electric field that forms between the solid electrodes 12 and 22 and a horizontal electric field that forms between the comb-shaped electrodes 14 and 15.

As shown in FIG. 17(a), for example, when a voltage is applied to the identical and oppositely disposed solid electrodes 12 and 22, the flakes rotate around the supporting members 34 (which serve as fulcrums) such that the long axes of the flakes become parallel to the lines of electric force. This rotation occurs due to dielectrophoresis and forces governed by Coulomb's law or other laws of electrical energy. In other words, the flakes orient (vertically) such that the long axes thereof are perpendicular to the substrates 10b and 20b. As shown in FIG. 19(a), in this state light from the backlight 3 that enters the light modulating layer 30b passes therethrough and exits on the viewer side of the display device.

Meanwhile, as shown in FIG. 17(b), when a voltage of at least a certain magnitude is applied to the in-plane pair of comb-shaped electrodes 14 and 15 that are arranged such that they "gear" together, the flakes rotate around the supporting members 34 (which serve as fulcrums) and orient (horizontally) near the comb-shaped electrodes 14 and 15 and cling to the substrate 10b. This rotation occurs due to electrophoresis and forces governed by Coulomb's law.

In this horizontal alignment state, the reflection surfaces of the flakes are aligned parallel to the substrate 10b, and any incident light reflects off of these reflection surfaces and does not pass through to the surface opposite to the side from which the light came. Therefore, light from the backlight 3 that would have entered the light modulating layer 30b is blocked by the horizontally aligned flakes.

It should be noted that the degree to which all of the flakes reach a certain alignment state can be controlled according to the magnitude of the applied voltage. In such states, depending on the magnitude of the applied voltage, at least part of the light from the backlight 3 that would have entered the light modulating layer 30b is blocked by the flakes. In this way, the transmittance of light from the backlight 3 that enters the light modulating layer 30b can be changed.

Moreover, the voltage applied to the solid electrodes 12 and 22 and the voltage applied to the comb-shaped electrodes 14 and 15 when switching the flakes from the vertical alignment state to the horizontal alignment state may be set to different values such that the optimal voltage is applied to each electrode.

For purposes of convenient operation, however, the flakes can be rotated around the supporting members 34 (which serve as fulcrums) to switch the flakes from the vertical alignment state to the horizontal alignment state simply by switching the electrodes to which a voltage is applied, as follows. Starting from a state in which a prescribed voltage of a magnitude at least as large as a threshold value at which the flakes will orient horizontally is applied to the solid electrodes 12 and 22 using the power source 61, the relay circuits can be used to switch the voltage to be applied to the comb-shaped electrodes 14 and 15.

FIGS. 20(*a*) and 20(*b*) are cross-sectional views showing lines of electric force that form between the comb-shaped electrodes 14 and 15. FIG. 20(*a*) depicts a case in which a high voltage is applied to the comb-shaped electrodes 14 and 15, and FIG. 20(*b*) depicts a case in which a low voltage is applied to the comb-shaped electrodes 14 and 15.

As shown in FIGS. 20(*a*) and 20(*b*), the amount of electrical energy present along the lines of electric force that form between the comb-shaped electrodes 14 and 15 depends on the magnitude of the voltage applied thereto.

As shown in FIG. 20(*a*), when a high voltage (such as a 0.4V/μm voltage, for example) is applied to the comb-shaped electrodes 14 and 15, the flakes orient completely parallel to the energetically strong lines of electric force.

Meanwhile, when a relatively low voltage (such as a 0.2V/μm voltage, for example) is applied to the comb-shaped electrodes 14 and 15, the flakes orient perpendicular to the electrodes when viewed from the normal direction with respect to the substrates 10*b* and 20*b*, and many of the flakes do not cling to the substrate (that is, the substrate 10*b* on which the comb-shaped electrodes 14 and 15 are formed and to which the flakes do cling when the applied voltage is high, as described above). This is because the above alignment state is the next most stable state after the state in which the flakes cling to the substrate, and therefore when the applied voltage is low, not all of the flakes reach the alignment state in which they cling to the substrate.

When a voltage is applied to the comb-shaped electrodes 14 and 15, the flakes rotate such that the long axes thereof become perpendicular to the comb-shaped electrodes 14 and 15 when viewed from the normal direction with respect to the substrates. In this state, if a voltage of a magnitude at least as large as the threshold value is then applied to the comb-shaped electrodes 14 and 15, the flakes orient horizontally and cling to the substrate 10*b*, as shown in FIGS. 17(*b*) and 19(*b*).

As shown in FIG. 19(*b*), when the flakes are in the horizontal alignment state in which the long axes of the flakes are parallel to the substrates 10*b* and 20*b*, light from the backlight 3 that would have entered the light modulating layer 30*b* is completely blocked by the flakes and does not pass through the light modulating layer 30*b*.

The voltage (threshold value) that must be applied to the comb-shaped electrodes 14 and 15 to switch the flakes to the horizontal alignment state in which the flakes are parallel to the substrates 10*b* and 20*b* is determined in advance according to the shape and material used for the flakes (the shape-anisotropic members 32*b*), the substance (material) used for the medium 31, the electrode spacing (distance between adjacent electrodes) of the comb-shaped electrodes 14 and 15, the thickness (cell thickness) of the light modulating layer 30*b*, and the like.

Therefore, as shown in FIGS. 17(*a*) and 17(*b*) as well as in FIGS. 19(*a*) and 19(*b*), all that needs to be done to make the flakes rotate between the horizontal alignment state and the vertical alignment state is apply a voltage of a magnitude at least as large as the predetermined threshold value to the comb-shaped electrodes 14 and 15.

As described above, this threshold value depends on parameters such as the shape and material used for the shape-anisotropic members 32*b* and the thickness (cell thickness) of the light modulating layer 30*b*. However, the threshold value can be set to a value in the range of 0.3V/μm to 1V/μm, for example.

FIG. 21(*a*) is a plan view photomicrograph of the alignment state of the flakes taken when a voltage was applied to the solid electrodes 12 and 22. FIG. 21(*b*) is a plan view photomicrograph of the alignment state of the flakes taken when a relatively low voltage was applied to the comb-shaped electrodes 14 and 15. FIG. 21(*c*) is a plan view photomicrograph of the alignment state of the flakes taken when a relatively high voltage was applied to the comb-shaped electrodes 14 and 15.

Here, propylene carbonate was used for the medium 31, and aluminum flakes with a diameter of 6 μm and a thickness of 0.1 μm were used for the shape-anisotropic members 32*b*. The cell thickness was set to 79 μm. Moreover, an ITO film with a film thickness of 1000 Å was used for the solid electrodes 12 and 22, a silicon nitride film with a film thickness of 1000 Å was used for the insulating layer, and an ITO film with a film thickness of 1000 Å was used for the comb-shaped electrodes 14 and 15. The electrode width was set to 3 μm for both of the comb-shaped electrodes 14 and 15. Moreover, the electrode spacing between adjacent electrodes was set to 5 μm for both of the sub-electrodes 14A and 15A.

In FIG. 21(*a*), a 3V AC voltage (vertical electric field) was applied to the solid electrodes 12 and 22.

In FIG. 21(*b*), the relay circuits 41 and 51 were switched to apply a 0.2V/μm AC voltage (horizontal electric field) to the comb-shaped electrodes 14 and 15.

In FIG. 21(*c*), a 0.4V/μm AC voltage (horizontal electric field) was applied to the comb-shaped electrodes 14 and 15.

The frequency of the applied voltage was 60 Hz in all cases.

As shown in FIG. 21(*a*), the edge surfaces of the flakes are visible when a voltage is applied to the solid electrodes 12 and 22. Therefore, as mentioned above, the thinner the shape-anisotropic members 32*b* (here, the flakes) are, the more the transmittance of the overall display device can be increased.

<Electric Potential of Each Electrode when the Flakes are in the Vertical Alignment State>

The electric potential of the comb-shaped electrodes 14 and 15 relative to the solid electrodes 12 and 22 when the flakes are in the vertical alignment state can be set equal to other in-plane points where no part of the comb-shaped electrodes 14 and 15 is present. This can be done in consideration of the voltage drop that occurs across to the insulating layer 13 and the light modulating layer 30*b* (the driving layer).

Alternatively, the electric potential of the comb-shaped electrodes 14 and 15 can be left unset such that the comb-shaped electrodes 14 and 15 are in an insulated state. In this case, there is no difference in electric potential between the solid electrode 12 and the comb-shaped electrodes 14 and 15. This results in the formation of the same lines of electric force that would form if the comb-shaped electrodes 14 and 15 were not present in the display device.

<Electric Potential of Each Electrode when the Flakes are in the Horizontal Alignment State>

The electric potential of the solid electrodes 12 and 22 relative to the comb-shaped electrodes 14 and 15 when the flakes are in the horizontal alignment state can be set to an intermediate value, such as 0V, of the electric potential applied to the comb-shaped electrodes 14 and 15, for example.

Alternatively, the electric potential of the solid electrodes 12 and 22 can be left unset such that the solid electrodes 12 and 22 are in an insulated state. However, in this case the flakes may be affected by the influence of external charges and the like.

As described above, the present embodiment includes the pair of oppositely disposed substrates 10b and 20b on which the identical and oppositely disposed solid electrodes 12 and 22 are provided. Applying a voltage to these solid electrodes 12 and 22 creates a uniform vertical electric field that causes the flakes to orient vertically. Moreover, applying a voltage to the comb-shaped electrodes 14 and 15 allows all of the flakes to be aligned horizontally.

In particular, it should be noted that in the present embodiment, applying the abovementioned electric potentials to each electrode and then applying a voltage to the solid electrodes 12 and 22 creates an essentially uniform electric field.

In the present embodiment, forming the solid electrodes 12 and 22 on the oppositely disposed substrates as described above ensures that when a vertical electric field is created, there are no regions in which the electric field is weak, and therefore the flakes orient vertically without clumping together.

Moreover, applying a horizontal electric field using the comb-shaped electrodes as is done in the present embodiment ensures that the flakes orient horizontally in an electrically stable state. Therefore, in the present embodiment, the three-dimensional orientation of the flakes can be controlled, and the surfaces of the flakes can be aligned parallel to the substrates.

Therefore, a polarizing plate is not required, and the present embodiment can provide a display panel 2b and a display device 1b that are simultaneously simple and exhibit high contrast and high light use efficiency.

Moreover, as in Embodiment 1, because part of each flake (each shape-anisotropic member 32b) is rotatably connected to one of the supporting members 34, the flakes do not exhibit non-uniform in-plane behavior of the type found in conventional technologies (see FIG. 24). As a result, the present embodiment can reduce the occurrence of problems of the type found in conventional display technologies, such as display irregularities and regions in which nothing is displayed.

Embodiment 4

A display device according to Embodiment 4 of the present invention will be described below with reference to figures.

Note that the description below focuses primarily on the aspects of the display device according to the present embodiment that are different from the display device according to Embodiment 1. The same reference characters are used to indicate the components that have the same functions as the components introduced in Embodiment 1, and the description of those components will be omitted here.

FIGS. 22(a) and 22(b) are cross-sectional views schematically illustrating a configuration of a display device 1c according to Embodiment 4. The display device 1c includes a display panel 2c, a backlight 3 disposed oppositely to the display panel 2c, and a drive circuit (not shown in the figure).

The display device 1c is a transmissive display device in which light from the backlight 3 passes through the display panel 2c to display an image.

The display panel 2c includes a pair of substrates 10c and 20c disposed oppositely to one another as well as a light modulating layer 30c provided in between the pair of substrates 10c and 20c. The first substrate 10c is provided on the rear side (near the backlight 3) of the display device, and the second substrate 20c is provided on the display surface side (viewer side) of the display device. Moreover, the display panel 2c includes a large number of pixels arranged in a matrix pattern.

As described below, an alignment treatment is applied to the substrates 10c and 20c in order to make liquid crystal molecules 35 contained in the light modulating layer 30c orient in a twisting manner. This alignment treatment is applied in the form of an alignment film 15 formed on the substrate 10c and an alignment film 25 formed on the substrate 20c. More specifically, a process in which a polyimide film of thickness 800A is formed and then a rubbing treatment is applied can be used, for example. However, the alignment treatment is not limited to this example, and any well-known method can be used.

Moreover, it is preferable that the alignment treatment result in the liquid crystal molecules 35 aligning at twist angles in the range of 90°≤twist angle≤3600° moving from the substrate 10c to the substrate 20c when no voltage is applied to the light modulating layer 30c.

The light modulating layer 30c includes a liquid crystal material 31 that contains a large number of liquid crystal molecules 35, shape-anisotropic members 32c, and supporting members 34.

A voltage is applied to the light modulating layer 30c using a power source 33 connected to electrodes 12 and 22, and the transmittance of light from the backlight 3 that enters the light modulating layer 30c is controlled by changing the applied voltage.

A material that aligns in a twisting manner between the substrates 10c and 20c is used for the liquid crystal material 31. A chiral nematic liquid crystal mixture in which a chiral agent is added to nematic liquid crystals can be used, for example. The concentration of the chiral agent should be determined based on the type of chiral agent and the type of nematic liquid crystals that are used. Also, the concentration of the chiral agent should be adjusted such that the chiral pitch is 70 μm in a panel in which the alignment direction of the alignment film 15 (the rubbing direction) and the alignment direction of the alignment film 25 are offset by 90° and in which the thickness (cell thickness) of the light modulating layer 30c is set to 45 μm.

Moreover, p-type liquid crystals that exhibit positive dielectric anisotropy or n-type liquid crystals that exhibit negative dielectric anisotropy may be used for the nematic liquid crystals. Unless noted otherwise, the following description assumes use of p-type liquid crystals.

The supporting members 34 are formed on the electrode 22 of the substrate 20c using a resin.

The shape-anisotropic members 32c exhibit a rotational response according to the direction of the electric field applied, and the surfaces of the shape-anisotropic members 32c should be treated such that liquid crystals orient parallel thereto. Moreover, one part of each of the shape-anisotropic members 32c is connected to one of the supporting members 34 such that the shape-anisotropic members 32c can rotate (or deform) around the supporting members 34 (which serve as fulcrums). The shape and other characteristics of the shape-anisotropic members 32c are the same as in Embodiment 1.

Next, a method for controlling the transmittance of light using the light modulating layer 30c will be described with reference to FIG. 22. In the following description, flakes are used for the shape-anisotropic members 32c.

FIG. 22(a) depicts a state in which the transmittance of the display device 1c is low (the amount of light transmitted is small), and FIG. 22(b) depicts a state in which the transmittance of the display device 1c is high (the amount of light transmitted is large).

As shown in FIG. 22(a), the flakes orient horizontally by rotating around the supporting members 34 (which serve as fulcrums) such that the long axes of the flakes become parallel to the substrates 10c and 20c, thereby achieving a state in which the flakes block light.

In this horizontal alignment state, the surfaces of the flakes are aligned parallel to the substrates 10c and 20c, and any incident light reflects off of these surfaces and does not pass through to the surface opposite to the side from which the light came.

Meanwhile, as shown in FIG. 22(b), the flakes orient vertically by rotating around the supporting members 34 (which serve as fulcrums) such that the long axes of the flakes become perpendicular to the substrates 10c and 20c, thereby achieving a state in which incident light passes through the light modulating layer 30c.

Here, the phrase "light passes through the light modulating layer 30c" includes both cases in which incident light passes directly through the light modulating layer 30c as well as cases in which incident light reflects off the surfaces of the flakes and proceeds through to the surface of the substrate opposite to the substrate on the side from which the light came.

Providing a backlight on the rear side of the display device allows images to be displayed in a transmissive manner similar to that in a liquid crystal display.

Next, a method for controlling the alignment of the flakes will be described in detail. FIG. 22 shows the flakes used for the shape-anisotropic members 32c as well as the alignment states of some of the liquid crystal molecules 35 contained in the liquid crystal material 31.

Moreover, the alignment direction of the alignment film 15 and the alignment direction of the alignment film 25 are rotated by 180° relative to one another when viewed in a plan view. Therefore, when no voltage is applied to the light modulating layer 30c, the liquid crystal molecules 35 twist in a spiraling manner around the perpendicular direction with respect to the substrates 10c and 20c such that the long axes of liquid crystal molecules 35 that are separated by at least a prescribed distance along this perpendicular direction are aligned in different directions relative to one another.

Moreover, p-type liquid crystals are used for the liquid crystal material 31.

FIG. 22(a) depicts the alignment states of the flakes and the liquid crystal molecules 35 when no voltage is applied to the light modulating layer 30c. FIG. 22(b) depicts the alignment states of the flakes and the liquid crystal molecules 35 when a voltage is applied to the light modulating layer 30c.

A drive circuit (not shown in the figure) is used to make the voltage applied to the light modulating layer 30c in the case shown in FIG. 22(b) larger than the voltage applied to the light modulating layer 30c in the case shown in FIG. 22(a).

As shown in FIG. 22(a), when no voltage is applied to the light modulating layer 30c, the liquid crystal molecules 35 orient in a spiraling manner around a spiral axis that is perpendicular to the surfaces of the substrates 10c and 20c in accordance with the alignment direction of the alignment film 25. In other words, the alignment direction of the liquid crystal molecules 35 twists 180° moving from the substrate 10c to the substrate 20c.

Furthermore, because the flakes are rotated such that the surfaces thereof are parallel to the liquid crystal molecules 35, the surfaces of the flakes are also parallel to the surfaces of the substrates. In other words, the flakes orient horizontally.

Here, the flakes are supported in two directions (along two axes) due to the presence of the liquid crystal molecules 35 near one of the surfaces and the presence of the liquid crystal molecules 35 near the other surface. Therefore, the flakes receive a restraining force from the liquid crystal molecules 35 and therefore maintain the horizontal alignment state.

When a voltage is applied to the light modulating layer 30c, the angle between the long axes of the liquid crystal molecules 35 and the surfaces of the substrates increases according to the magnitude of the voltage applied.

The flakes rotate around the supporting members 34 (which serve as fulcrums) such that the long axes of the flakes become closer to parallel to the lines of electric force. The rotation of the flakes into this vertical alignment state occurs due to dielectrophoresis and forces governed by Coulomb's law or other laws of electrical energy.

The rotation of the flakes around the supporting members 34 (which serve as fulcrums) represents a change in the alignment of the flakes. This alignment change is accompanied by a change in the angle between the direction normal to the flake surfaces that have the largest area and the direction normal to the surfaces of the substrates 10c and 20c.

Furthermore, as shown in FIG. 22(b), when the magnitude of the voltage applied to the light modulating layer 30c reaches a prescribed value, the liquid crystal molecules 35 orient such that the long axes thereof are perpendicular to the surfaces of the substrates 10c and 20c.

The flakes rotate around the supporting members 34 (which serve as fulcrums) such that the direction normal to the flake surfaces that have the largest area is perpendicular to the direction normal to the surfaces of the substrates 10c and 20c.

When p-type liquid crystals are used for the liquid crystal material 31, the magnitude of the voltage applied to the light modulating layer 30c can be adjusted to make the liquid crystal molecules 35 orient in an intermediate state relative to the surfaces of the substrates.

Therefore, the amount of light transmitted can be controlled according to the magnitude of the voltage applied to the light modulating layer, thereby facilitating display of halftones in the display device 1c.

A plan view image taken when no voltage is applied to the light modulating layer 30c and the flakes are in the horizontal alignment state would appear as shown in FIG. 4(a). A plan view image taken when a voltage is applied to the light modulating layer 30c and the flakes are in the vertical alignment state would appear as shown in FIG. 4(b).

As described above, the magnitude of the voltage applied to the light modulating layer 30c can be changed to make the flakes rotate around the supporting members 34 (which serve as fulcrums) and reversibly control the flake alignment state (that is, the flakes can be switched between alignment states).

As described above, when p-type liquid crystals are used and a voltage is applied, the liquid crystal molecules 35 enter a homeotropic alignment state in which the restraining force keeping the flakes in the horizontal alignment state disappears and the flakes can rotate into the vertical alignment state.

When n-type liquid crystals are used for the liquid crystal material 31 and no voltage is applied to the light modulating layer 30c, the liquid crystal molecules 35 orient such that the long axes thereof are parallel to the surfaces of the substrates. As a result, the flakes orient horizontally.

Moreover, the alignment of the n-type liquid crystal molecules 35 does not change even if a voltage is applied to the light modulating layer 30c. However, the alignment of the flakes does change and the flakes rotate into the vertical alignment state due to dielectrophoresis and forces governed by Coulomb's law or other laws of electrical energy. Then, if the applied voltage is lowered, the flakes can be quickly returned to the horizontal alignment state due to the restraining forces applied to the flakes due to the alignment of the liquid crystal molecules 35.

Moreover, when n-type liquid crystals are used, the liquid crystal molecules 35 constantly apply a force to the flakes that attempts to rotate the flakes into the horizontal alignment state even when a voltage is applied to the light modulating layer 30c. Therefore, balancing the rotational torque force applied to the flakes due to the applied voltage and the restraining force (that attempts to rotate the flakes into the horizontal alignment state) applied to the flakes by the liquid crystal molecules 35 facilitates display of halftones in the display device 1c.

As described above, the display device 1c according to the present embodiment has a simple configuration and allows light use efficiency to be increased. Moreover, the alignment states of the shape-anisotropic members 32c are stable regardless of whether a voltage is applied to the light modulating layer 30c, and therefore the display panel can be driven back and forth between light and dark states at a high switching speed.

Moreover, as in Embodiment 1, because part of each flake (each shape-anisotropic member 32c) is rotatably connected to one of the supporting members 34, the flakes do not exhibit non-uniform in-plane behavior of the type found in conventional technologies (see FIG. 24). As a result, the present embodiment can reduce the occurrence of problems of the type found in conventional display technologies, such as display irregularities and regions in which nothing is displayed.

In order to solve the abovementioned problems, the display panels (2, 2a, 2b, 2c) of the present invention include:

a rear-side first substrate (10, 10a, 10b, 10c) and a display surface side second substrate (20, 20a, 20b, 20c) disposed oppositely to each other;

a light modulating layer that contains a plurality of shape-anisotropic members (32, 32a, 32b, 32c) that rotate according to the direction of an electric field and that is provided between the first substrate and the second substrate for controlling the transmittance of incident light by changing the area projected onto the first substrate and second substrate by the shape-anisotropic members; and one or more supporting members (34) provided on the first substrate or the second substrate to support each of the shape-anisotropic members;

wherein each of the shape-anisotropic members is rotatably connected to one of the supporting members.

Moreover, because the shape-anisotropic members (flakes) are rotatably connected to one of the supporting members, the flakes do not exhibit non-uniform in-plane behavior of the type found in conventional technologies (see FIG. 24). As a result, these display panels can reduce the occurrence of problems of the type found in conventional display technologies, such as display irregularities and regions in which nothing is displayed. Moreover, because the transmittance of light can be changed by rotating the shape-anisotropic members, these display panels do not require polarizing plates and can achieve a higher light use efficiency than conventional liquid crystal panels.

In the display panels described above, it is preferable that a part of each of the shape-anisotropic members be rotatably connected to one of the supporting members.

The display panels described above can also be configured such that the voltage applied to the light modulating layer is switched between an AC voltage and a DC voltage with a frequency of 0 Hz.

This simplifies the configuration of the display panels because the transmittance of light can be changed simply by changing the frequency of the voltage applied to the light modulating layer.

In the display panels described above, it is preferable that the voltages applied to the light modulating layer be AC voltages.

The display panels described above can also be configured such that: the light modulating layer blocks light when a DC voltage or a low frequency AC voltage is applied thereto, and the light modulating layer transmits light when a high frequency AC voltage is applied thereto.

The display panels described above can also be configured such that: the light modulating layer includes a polar solvent (31a), a non-polar solvent (31b), and a plurality of shape-anisotropic members that are either hydrophilic or hydrophobic; one of either the first substrate or the second substrate is hydrophilic so that the polar solvent stays in contact therewith; the other substrate is hydrophobic so that the non-polar solvent stays in contact therewith; and the area projected onto the first substrate and second substrate by the shape-anisotropic members can be changed by changing the magnitude of the voltage applied to the light modulating layer.

This configuration makes it possible to do the following when no voltage is applied to the light modulating layer. First, if the shape-anisotropic members are hydrophilic, these members can be aligned (horizontally) within the polar solvent. Next, if the shape-anisotropic members are hydrophobic, these members can be aligned (horizontally) within the non-polar solvent. Moreover, the area projected onto the first and second substrates by the shape-anisotropic members can be changed by applying a voltage to the light modulating layer.

By providing the shape-anisotropic members between a hydrophilic substrate and a hydrophobic substrate and making the shape-anisotropic members themselves either hydrophilic or hydrophobic, the shape-anisotropic members can be contained within either the polar solvent or the non-polar solvent when no voltage is applied to the light modulating layer, and light can be transmitted by applying a voltage to the light modulating layer. Therefore, a display panel with a simple configuration and a high light use efficiency can be provided.

The display panels described above can also be configured such that: if the shape-anisotropic members are hydrophilic and are aligned such that the long axes thereof are parallel to the first and second substrates, the shape-anisotropic members are contained within the polar solvent; and if the shape-anisotropic members are hydrophobic and are aligned such that the long axes thereof are parallel to the first and second substrates, the shape-anisotropic members are contained within the non-polar solvent.

In this way, the shape-anisotropic members can be stabilized at a point within the polar solvent or the non-polar solvent.

The display panels described above can also be configured such that: the first and second substrates each include a solid electrode (12, 22); at least one of the substrates includes an insulating layer and at least one comb-shaped electrode (14, 15) provided in order on top of the solid electrode; and the display panel includes circuits for changing the direction of the electric field applied to the light modulating layer.

The display panels described above include a pair of oppositely disposed substrates on which identical and oppositely disposed solid electrodes are provided. Applying a voltage to these solid electrodes creates a uniform vertical electric field (that is, an electric field of uniform strength in the direction perpendicular to the pair of substrates) that causes the shape-anisotropic members to orient vertically such that the long axes thereof are perpendicular to the pair of substrates. Therefore, this configuration ensures that when a vertical electric field is created, there are no regions in which the electric field is weak, and therefore the shape-anisotropic members orient vertically without clumping together.

Moreover, the display panels described above include one or more comb-shaped electrodes. Applying a voltage to these comb-shaped electrodes creates a horizontal electric field that is parallel to the substrates, and therefore the shape-anisotropic members can be aligned horizontally such that the long axes thereof are parallel to the substrates.

The display panels described above can also be configured such that the circuits for changing the direction of the applied electric field include selection circuits that select, out of the electrodes provided on the first and second substrates, the electrodes to which to apply a voltage.

The display panels described above can also be configured such that: a plurality of comb-shaped electrodes are provided on at least one of either the first substrate or second substrate, and the selection circuits apply a voltage either to the solid electrodes provided on the first substrate and the second substrate or to the comb-shaped electrodes provided on one of either the first substrate or the second substrate.

The display panels described above can also be configured such that: the light modulating layer includes a liquid crystal material (31) that contains liquid crystal molecules; the first substrate and second substrate receive an alignment treatment on the surfaces that are in contact with the light modulating layer; the alignment treatment is applied such that the liquid crystal molecules either orient in a twisting manner moving from the first substrate to the second substrate when no voltage is applied to the light modulating layer, or orient approximately perpendicular to the first substrate and second substrate; and the area projected onto the first substrate and second substrate by the shape-anisotropic members can be changed by changing the voltage applied to the light modulating layer in order to change the alignment of the liquid crystal molecules.

In this configuration, the liquid crystal molecules stay aligned due to the alignment treatment even when no voltage or a low voltage is applied to the light modulating layer, and therefore the alignment of the shape-anisotropic members can be reversibly changed. This configuration makes it possible to provide a display panel that has a simple configuration, exhibits increased light use efficiency, and that can be driven back and forth between light and dark states at a high switching speed. Moreover, controlling the alignment of the liquid crystal molecules facilitates the display of halftones.

The display panels described above can also be configured such that: the alignment treatment is applied such that when no voltage is applied to the light modulating layer, the liquid crystal molecules orient in a twisting manner moving from the first substrate to the second substrate; and a chiral agent is added to the liquid crystal material.

The display panels described above can also be configured such that when no voltage is applied to the light modulating layer, the liquid crystal molecules orient in a twisting manner with twist angles in the range of 90°≤twist angle≤3600° moving from the first substrate to the second substrate.

In order to solve the abovementioned problems, the present display device includes the abovementioned display panel and a backlight (3) provided on the same side where the first substrate is located.

In order to solve the abovementioned problems, a method for manufacturing the display panel of the present invention, the display panel having a rear-side first substrate and a display surface side second substrate disposed oppositely to each other as well as a light modulating layer that contains a plurality of shape-anisotropic members that rotate according to the direction of an electric field and that is provided between the first substrate and the second substrate for controlling the transmittance of incident light by changing the area projected onto the first substrate and second substrate by the shape-anisotropic members, includes the steps of:

injecting, between the first substrate and the second substrate, a photocurable resin material and a medium into which the shape-anisotropic members are mixed;

applying a voltage in between the first substrate and the second substrate after the injection step; and irradiating the display panel with UV light after the voltage application step.

This method makes it possible to manufacture a display panel that exhibits increased light use efficiency and decreased occurrence of display anomalies.

The present invention is not limited to the embodiments described above, and various modifications can be made without departing from the scope of the claims. Therefore, embodiments obtained by appropriately combining the techniques disclosed in different embodiments are included in the technical scope of the present invention.

INDUSTRIAL APPLICABILITY

The present invention is suitable for use in a display such as that used in a television.

DESCRIPTION OF REFERENCE CHARACTERS 1, 1a, 1b, 1c display device
2, 2a, 2b, 2c display panel 3 backlight
10, 10a, 10b, 10c substrate (first substrate)
11 glass substrate
12 electrode (pixel electrode)
13 insulating layer
20, 20a, 20b, 20c substrate (second substrate)
21 glass substrate
22 electrode (common electrode)
23 color filter
30, 30a, 30b, 30c light modulating layer
31 medium
32, 32a, 32b, 32c shape-anisotropic member
33 power source
34 supporting member

What is claimed is:

1. A display panel, comprising:
   a first substrate and a second substrate facing each other;
   a light modulating layer between said first substrate and said second substrate having a plurality of shape-anisotropic members that rotate in accordance with a direction of an electric field, said light modulating layer controlling transmittance of incident light by changing an area projected onto a plane parallel to the first substrate and the second substrate by the shape-anisotropic members; and
   one or more supporting members provided on the first substrate or the second substrate to support the respective shape-anisotropic members, said supporting member being made of a photocurable resin,
   wherein the shape-anisotropic members are rotatably connected to the respective supporting members.

2. The display panel according to claim 1, wherein an end of each of the shape-anisotropic members is rotatably connected to the respective supporting members.

3. The display panel according to claim 1, wherein voltages applied to the light modulating layer are switched between an alternating current voltage and a direct current voltage with a frequency of 0 Hz.

4. The display panel according to claim 1, wherein the voltages applied to the light modulating layer are alternating current voltages.

5. The display panel according to claim 1, wherein the light modulating layer blocks light when a direct current voltage or a low frequency voltage is applied thereto, and allows light to pass therethrough when a high frequency voltage is applied thereto.

6. The display panel according to claim 1,
   wherein the light modulating layer includes a polar solvent, a non-polar solvent, and a plurality of shape-anisotropic members that are either hydrophilic or hydrophobic,
   wherein one of the first substrate and the second substrate is hydrophilic so that the polar solvent stays in contact therewith,
   wherein the other of the first and the second substrate is hydrophobic so that the non-polar solvent stays in contact therewith, and
   wherein the area projected onto the plane parallel to the first substrate and second substrate by the shape-anisotropic members is caused to change by altering a magnitude of a voltage applied to the light modulating layer.

7. The display panel according to claim 6,
   wherein when the shape-anisotropic members are hydrophilic and are aligned such that long axes thereof are parallel to the first and second substrates, the shape-anisotropic members are contained within the polar solvent, and
   wherein when the shape-anisotropic members are hydrophobic and are aligned such that the long axes thereof are parallel to the first and second substrates, the shape-anisotropic members are contained within the non-polar solvent.

8. The display panel according to claim 1, further comprising:
   solid electrodes respectively provided on the first substrate and the second substrate;
   at least one comb-shaped electrode provided on the solid electrode via an insulating layer on at least one of the first and second substrates; and
   a circuit for changing a direction of the electric field applied to the light modulating layer.

9. The display panel according to claim 8, wherein the circuit for changing the direction of the applied electric field comprises:
   a selection circuit that selects, out of the electrodes provided on the first and second substrates, the electrode to which to apply a voltage.

10. The display panel according to claim 9,
    wherein a plurality of comb-shaped electrodes are provided on at least one of the first substrate and the second substrate, and
    wherein the selection circuit selects the electrode to which to apply a voltage such that the voltage is applied either to the respective solid electrodes provided on the first substrate and the second substrate or to the comb-shaped electrodes provided on one of the first substrate and the second substrate.

11. The display panel according to claim 1,
    wherein the light modulating layer includes a liquid crystal material constituted of liquid crystal molecules,
    wherein the first substrate and the second substrate receive an alignment treatment on surfaces thereof that are in contact with the light modulating layer,
    wherein the alignment treatment is applied such that, when no voltage is applied to the light modulating layer, the liquid crystal molecules are helically twisted from the first substrate to the second substrate and, when a voltage is applied to the light modulating layer, the liquid crystal molecules are oriented approximately perpendicular to the first substrate and the second substrate, and
    wherein the area projected onto the plane parallel to the first substrate and second substrate by the shape-anisotropic members is caused to change by altering a voltage applied to the light modulating layer and thereby causing an orientation of the liquid crystal molecules to change.

12. The display panel according to claim 11,
    wherein the alignment treatment is applied such that, when no voltage is applied to the light modulating layer, the liquid crystal molecules helically twist from the first substrate to the second substrate, and
    wherein a chiral agent is added to the liquid crystal material.

13. The display panel according to claim 12, wherein the liquid crystal molecules helically twist at 90° to 3600° from the first substrate to the second substrate when no voltage is applied to the light modulating layer.

14. A display device, comprising:
the display panel according to claim 1; and
a backlight provided on the same side where the first substrate is located.

15. A method for manufacturing a display panel that has: a first substrate and a second substrate facing each other; and a light modulating layer between said first substrate and said second substrate having a plurality of shape-anisotropic members that rotate in accordance with a direction of an electric field, said light modulating layer controlling transmittance of incident light by changing an area projected onto a plane parallel to the first substrate and the second substrate by the shape-anisotropic members, said method comprising:
- injecting, between the first substrate and the second substrate, a photocurable resin material and a medium into which the shape-anisotropic members are mixed;
- applying a voltage in between the first substrate and the second substrate after the step of injecting; and
- irradiating the display panel with ultraviolet light after the applying a voltage step to cure the photocurable resin material to form supporting members on the first or second substrate that respectively support the shape-anisotropic members such that the respective shape-anisotropic members are rotatably connected to the supporting members.

* * * * *